(12) United States Patent
Takeshima et al.

(10) Patent No.: US 12,498,434 B2
(45) Date of Patent: Dec. 16, 2025

(54) MAGNETIC SENSOR ELEMENT, MAGNETIC SENSOR, AND MAGNETIC SENSOR DEVICE

(71) Applicant: Mitsubishi Electric Corporation, Tokyo (JP)

(72) Inventors: Kaito Takeshima, Tokyo (JP); Tomokazu Ogomi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 309 days.

(21) Appl. No.: 18/278,008

(22) PCT Filed: Mar. 31, 2021

(86) PCT No.: PCT/JP2021/013927
§ 371 (c)(1),
(2) Date: Aug. 21, 2023

(87) PCT Pub. No.: WO2022/208771
PCT Pub. Date: Oct. 6, 2022

(65) Prior Publication Data
US 2024/0142549 A1    May 2, 2024

(51) Int. Cl.
*G01R 33/09* (2006.01)
*H10N 50/10* (2023.01)
*H10N 50/85* (2023.01)

(52) U.S. Cl.
CPC ......... *G01R 33/093* (2013.01); *G01R 33/091* (2013.01); *G01R 33/098* (2013.01); *H10N 50/10* (2023.02); *H10N 50/85* (2023.02)

(58) Field of Classification Search
CPC . G01R 33/0093; G01R 33/091; G01R 33/098
See application file for complete search history.

(56) References Cited

U.S. PATENT DOCUMENTS

| 6,052,263 A | 4/2000 | Gill |
| 2006/0002031 A1 | 1/2006 | Shoji |

(Continued)

FOREIGN PATENT DOCUMENTS

| JP | 2000-067418 A | 3/2000 |
| JP | 2005-056950 A | 3/2005 |

(Continued)

OTHER PUBLICATIONS

Office Action issued Feb. 18, 2025 in German Patent Application No. 11 2021 007 445.8, 18 pages.

(Continued)

*Primary Examiner* — Alesa Allgood
(74) *Attorney, Agent, or Firm* — XSENSUS LLP

(57) ABSTRACT

A magnetic sensor element includes a pinned layer, a first non-magnetic layer, a first magnetic layer, and a free layer. The pinned layer has a fixed magnetization direction. The first non-magnetic layer is laminated on the pinned layer. The first magnetic layer holds the first non-magnetic layer with the pinned layer. The free layer is disposed along a lamination direction in which the first non-magnetic layer is laminated on the pinned layer. Each of the first magnetic layer and the free layer has a magnetization direction more easily changed by an external magnetic field than that of the pinned layer. The pinned layer and the first magnetic layer are coupled by indirect exchange interaction.

12 Claims, 35 Drawing Sheets

(56) References Cited

U.S. PATENT DOCUMENTS

2013/0257581 A1    10/2013   Koike et al.
2017/0205474 A1     7/2017   Ogomi et al.
2018/0275218 A1     9/2018   Umetsu
2018/0275219 A1*    9/2018   Umetsu ................ G01R 33/093

FOREIGN PATENT DOCUMENTS

| JP | 2006-019383 A | 1/2006 | |
| JP | 2008-107266 A | 5/2008 | |
| JP | 2013-211472 A | 10/2013 | |
| JP | 2015-200551 A | 11/2015 | |
| JP | 2015200551 | * 11/2015 | ............ G01F 33/09 |
| WO | 2016/013650 A1 | 1/2016 | |
| WO | 2017/094888 A1 | 6/2017 | |

OTHER PUBLICATIONS

Xiaoyong Liu, et al., "Magnetic tunnel junction field sensors with hard-axis bias field" Journal of Applied Physics, vol. 92, No. 8, Oct. 15, 2002, 5 pages.

International Search Report and Written Opinion mailed on Jun. 29, 2021, received for PCT Application PCT/JP2021/013927, filed on Mar. 31, 2021, 9 pages including English Translation.

Notice of Reasons for Refusal mailed on Nov. 1, 2022, received for JP Application 2022-017218, 9 pages including English Translation.

* cited by examiner

MAGNETIC SENSOR ELEMENT, MAGNETIC SENSOR, AND MAGNETIC SENSOR DEVICE

CROSS-REFERENCE TO RELATED APPLICATION

The present application is based on PCT filing PCT/JP2021/013927, filed Mar. 31, 2021, the entire contents of which are incorporated herein by reference.

TECHNICAL FIELD

The present disclosure relates to a magnetic sensor element, a magnetic sensor, and a magnetic sensor device.

BACKGROUND ART

In order to determine the authenticity of a banknote inserted into an automated teller machine (ATM) or the like, a magnetic sensor device for detecting a magnetic pattern by magnetic ink printed on the banknote is used. The magnetic sensor device includes, for example, a magnetic sensor element and a magnet for applying a bias magnetic field to the magnetic sensor element. The magnetic sensor device includes, for example, a magnet and a magnetic sensor element. The magnet generates a cross magnetic field crossing an object (banknote). The magnetic sensor element is provided between the magnet and the banknote as the object to be detected. The magnetic sensor device is configured to output a change in the cross magnetic field due to a magnetic component of the object conveyed in the cross magnetic field as a change in a resistance value.

A minute soft magnetic material is commonly used for a magnetic ink used for printing banknotes. The soft magnetic material gives only a small magnetic field variation to an environmental magnetic field in a non-magnetized state. For this reason, a bias magnetic field may be further applied in order to increase the magnetic field variation given to the environmental magnetic field by the soft magnetic material. The magnetic field variation is detected on the basis of the magnetic field variation due to the soft magnetic material and the magnetic field variation due to the bias magnetic field. Meanwhile, the intensity of the magnetic field that varies due to the movement of the magnetic material is, for example, about 1/1000 of the intensity of the magnetic field by the bias magnetic field necessary for the magnetization of the soft magnetic material. Therefore, there is a demand for a magnetic sensor element having high sensitivity that sensitively responds to a tiny variation in a magnetic field.

For example, a magnetic detection element (magnetic sensor element) described in Japanese Patent Laying-Open No. 2006-019383 (PTL 1) is a spin-valve giant magnetic resistance (GMR) element. The magnetic detection element is used as a magnetic sensor in which a hysteresis is reduced under a bias magnetic field. The magnetic detection element is configured to detect magnetism on the basis of a resistance value of the magnetic detection element. The resistance value of the magnetic detection element is determined by an angular difference between the magnetization direction of a fixed layer (pinned layer) and the magnetization direction of a free layer.

CITATION LIST

Patent Literature

PTL 1: Japanese Patent Laying-Open No. 2006-019383

SUMMARY OF THE INVENTION

Technical Problem

The upper limit of a magnetic field intensity that can be measured by the magnetic detection element described in the above Patent Literature is the anisotropic magnetic field intensity (Hk) of the free layer. Therefore, a dynamic range of the magnetic detection element is not sufficiently large.

The present disclosure has been made in view of the above problems, and an object of the present disclosure is to provide a magnetic sensor element, a magnetic sensor, and a magnetic sensor element having a sufficiently large dynamic range.

Solution to Problem

A magnetic sensor element according to the present disclosure includes a pinned layer, a first non-magnetic layer, a first magnetic layer, and a free layer. The pinned layer has a fixed magnetization direction. The first non-magnetic layer is laminated on the pinned layer. The first magnetic layer holds the first non-magnetic layer with the pinned layer. The free layer is disposed along a lamination direction in which the first non-magnetic layer is laminated on the pinned layer. Each of the first magnetic layer and the free layer has a magnetization direction more easily changed by an external magnetic field than that of the pinned layer. The pinned layer and the first magnetic layer are coupled by indirect exchange interaction.

Advantageous Effects of Invention

According to the magnetic sensor element of the present disclosure, the dynamic range can be sufficiently increased.

DESCRIPTION OF EMBODIMENTS

Figure 1:
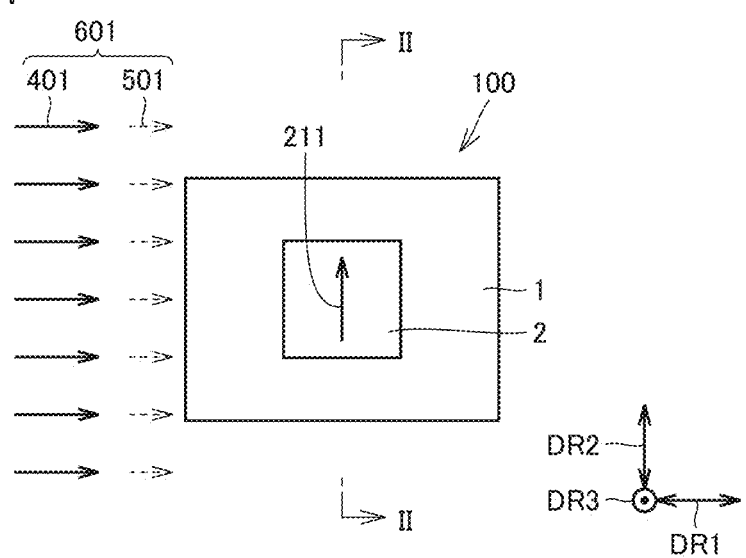
FIG. 1 is a top view schematically illustrating a configuration of a magnetic sensor according to a first embodiment.

Embodiments will be described below with reference to the drawings. In the following, the same or corresponding parts are denoted by the same reference numerals, and redundant description will not be repeated.

First Embodiment

The configurations of a magnetic sensor element 2 and a magnetic sensor 100 according to a first embodiment will be described with reference to FIGS. 1 to 4.

As illustrated in FIG. 1, magnetic sensor 100 includes a substrate 1 and magnetic sensor element 2. Magnetic sensor element 2 is electrically connected to substrate 1. Substrate 1 is, for example, a silicon substrate on which thermal silicon oxide is provided or a quartz substrate. Substrate 1 may be used, for example, in a wafer process.

Magnetic sensor element 2 is a magnetic sensor element for detecting a detection magnetic field 501 (magnetic pattern) of an object. Magnetic sensor element 2 is configured such that a bias magnetic field 401 and detection magnetic field 501 are applied. Bias magnetic field 401 is a magnetic field generated by an external magnetic field generating portion to be described later. Bias magnetic field 401 and detection magnetic field 501 are an external magnetic field 601.

Figure 2:
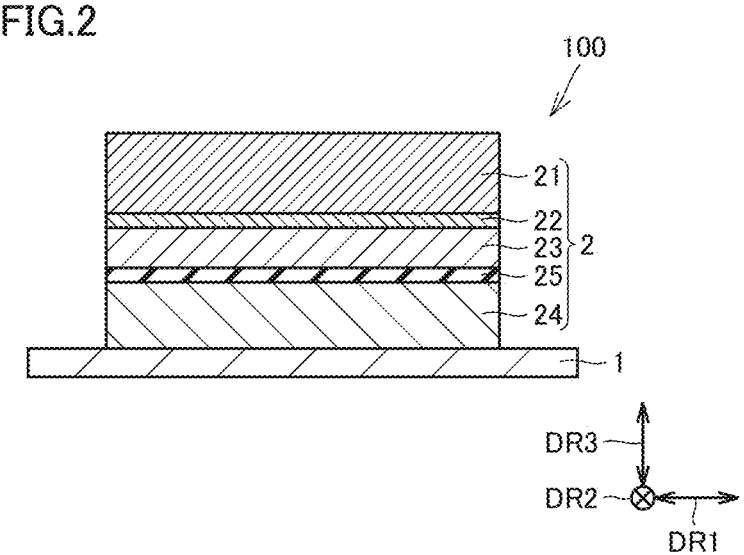
FIG. 2 is a cross-sectional view taken along line II-II in FIG. 1.

As illustrated in FIG. 2, magnetic sensor element 2 includes a pinned layer 21, a first non-magnetic layer 22, a first magnetic layer 23, and a free layer 24. In the present embodiment, the magnetic layer further includes a tunnel insulating film 25 using a tunneling effect.

In the present embodiment, pinned layer 21, first non-magnetic layer 22, first magnetic layer 23, tunnel insulating film 25, and free layer 24 are laminated in this order. Pinned layer 21, first non-magnetic layer 22, first magnetic layer 23, tunnel insulating film 25, and free layer 24 are formed by, for example, film formation by a sputtering method. For example, tunnel insulating film 25, first magnetic layer 23, first non-magnetic layer 22, and pinned layer 21 are sequentially formed on free layer 24. For example, first non-magnetic layer 22, first magnetic layer 23, tunnel insulating film 25, and free layer 24 may be sequentially formed on pinned layer 21.

Figure 3:
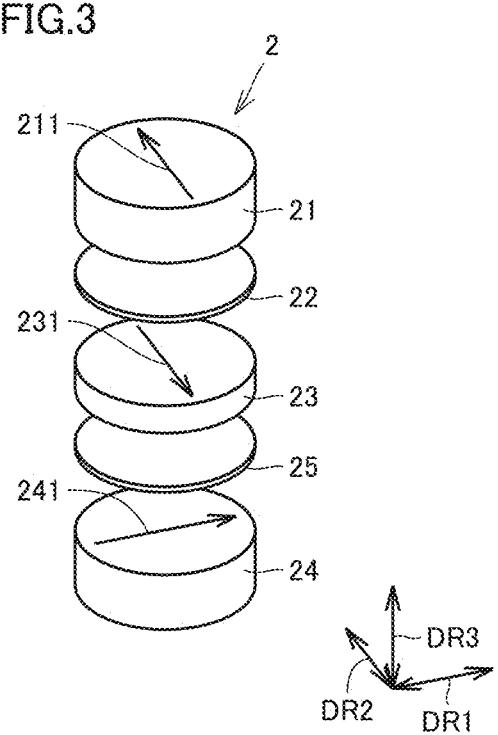
FIG. 3 is an exploded perspective view schematically illustrating the configuration of the magnetic sensor element according to the first embodiment in a state where an external magnetic field is not applied to the magnetic sensor element.

As illustrated in FIGS. 1 and 3, pinned layer 21 has a fixed magnetization direction 211. In a state where external magnetic field 601 is not applied, magnetization direction 211 of pinned layer 21 is orthogonal to a magnetization direction 241 of free layer 24 when viewed in a lamination direction (Z-axis direction DR3).

In the present embodiment, magnetization direction 211 of pinned layer 21 in a state where external magnetic field 601 is not applied to magnetic sensor element 2 is a Y-axis direction DR2. The direction in which first non-magnetic layer 22 is laminated on pinned layer 21 is Z-axis direction DR3. A direction intersecting with each of Y-axis direction DR2 and Z-axis direction DR3 is an X-axis direction DR1.

Although not illustrated, pinned layer 21 includes an antiferromagnetic film and a ferromagnetic film joined to each other. The antiferromagnetic film is, for example, iridium manganese (IrMn). The ferromagnetic film is, for example, cobalt platinum (CoPt). The antiferromagnetic film and the ferromagnetic film are joined to each other, whereby the magnetization direction of the ferromagnetic film is fixed to the magnetization direction at the joint surface of the antiferromagnetism film. Therefore, magnetization direction 211 of pinned layer 21 is fixed. Pinned layer 21 is subjected to heat treatment at a temperature equal to or higher than a blocking temperature of the antiferromagnetic film in a strong magnetic field. Pinned layer 21 which has been thermally treated is cooled. Thus, magnetization direction 211 of pinned layer 21 is fixed to the direction of the strong magnetic field applied during the heat treatment.

First non-magnetic layer 22 is laminated on pinned layer 21. First non-magnetic layer 22 is in contact with pinned layer 21 and first magnetic layer 23. The material of first non-magnetic layer 22 is, for example, ruthenium (Ru) or chromium (Cr).

First magnetic layer 23 holds first non-magnetic layer 22 with pinned layer 21. Therefore, pinned layer 21 and first magnetic layer 23 are coupled by indirect exchange interaction. Specifically, the coupling strength between pinned layer 21 and first magnetic layer 23 due to the indirect exchange interaction varies (vibrates) in a cosine function according to the distance between pinned layer 21 and first magnetic layer 23 (the thickness of first non-magnetic layer 22). In other words, the coupling strength due to the indirect exchange interaction is controlled by controlling the thickness of first non-magnetic layer 22.

The direction of coupling between pinned layer 21 and first magnetic layer 23 by indirect exchange interaction varies (vibrates) in a cosine function according to the distance between pinned layer 21 and first magnetic layer 23 (the thickness of first non-magnetic layer 22). In other words, the direction of coupling by the indirect exchange interaction is controlled by controlling the thickness of first non-magnetic layer 22. Preferably, the thickness of first non-magnetic layer 22 is controlled such that the direction of coupling between pinned layer 21 and first magnetic layer by indirect exchange interaction is parallel or antiparallel. For example, when first non-magnetic layer 22 is made of ruthenium (Ru) having a thickness of 0.4 nm, the direction of coupling by indirect exchange interaction is parallel. When first non-magnetic layer 22 is made of ruthenium (Ru) having a thickness of 0.9 nm, the direction of coupling by indirect exchange interaction is antiparallel.

In the present embodiment, first non-magnetic layer 22 is made of ruthenium (Ru) having a thickness of 0.9 nm. Therefore, in a state where external magnetic field 601 is not applied, magnetization direction 231 of first magnetic layer 23 is opposite (antiparallel) to magnetization direction 211 of pinned layer 21. Note that, in a state where external magnetic field 601 is not applied, magnetization direction 231 of first magnetic layer 23 may be the same as (parallel to) magnetization direction 211 of pinned layer 21 as will be described later.

First magnetic layer 23 has a magnetization direction more easily changed by external magnetic field 601 than that of pinned layer 21. The material of first magnetic layer 23 is, for example, cobalt iron boron (CoFeB) having a high magneto-resistance ratio (MR ratio) in a case where the material of tunnel insulating film 25 is magnesium oxide (MgO). The material of first magnetic layer 23 may be cobalt iron (CoFe).

Free layer 24 is disposed along the direction (Z-axis direction DR3) in which first non-magnetic layer 22 is laminated on pinned layer 21. Free layer 24 has a magnetization direction more easily changed by external magnetic field 601 than that of pinned layer 21. The magnetization easy axis (magnetization direction 241) of free layer 24 is set by a method similar to the method of fixing magnetization direction 211 of pinned layer 21.

Preferably, the material of free layer 24 is, for example, cobalt iron boron (CoFeB) having a high magneto-resistance ratio (MR ratio) in a case where the material of tunnel insulating film 25 is magnesium oxide (MgO). The material of free layer 24 may be cobalt iron (CoFe). The material of free layer 24 may be appropriately determined as long as it allows free layer 24 to react sensitively to external magnetic field 601 (see FIG. 4). The material of free layer 24 may be a magnetic material having characteristics as a soft magnetic material. Examples of the material having characteristics as a soft magnetic material include nickel iron (NiFe) called permalloy, and cobalt iron silicon boron (CoFeSiB) which is an amorphous soft magnetic material.

First magnetic layer 23 and free layer 24 hold tunnel insulating film 25 therebetween. Tunnel insulating film 25 is in contact with first magnetic layer 23 and free layer 24. The material of tunnel insulating film 25 is, for example, magnesium oxide (MgO). The material of tunnel insulating film 25 may be, for example, aluminum oxide (AlO). Tunnel insulating film 25 may be formed by natural oxidation after a metal film is formed by sputtering.

Magnetic sensor element 2 according to the present embodiment is formed as a tunnel magneto resistance (TMR) element. The resistance value of magnetic sensor element 2, which is a TMR element, is determined by an angular difference between first magnetic layer 23 and free layer 24 that hold tunnel insulating film 25 therebetween. In a case where the angular difference between magnetization direction 231 of first magnetic layer 23 and magnetization direction 241 of free layer 24 is θ, and the tunnel spin polarizability of tunnel insulating film 25 is α, the resistance value R of magnetic sensor element 2 is represented by Equation (1).

$$R=R0/(1+\alpha\cos\theta)\qquad\text{Equation (1)}$$

The operation of magnetic sensor element 2 according to the first embodiment will be described with reference to FIGS. 3 to 5.

In FIG. 3, external magnetic field 601 (see FIG. 4) is not applied to magnetic sensor element 2. In a state where external magnetic field 601 is not applied, magnetization direction 211 of pinned layer 21 is parallel to the positive direction of the Y axis. In a state where external magnetic field 601 is not applied, magnetization direction 231 of first magnetic layer 23 is parallel or antiparallel to the positive direction of the Y axis. In FIG. 3, magnetization direction 231 of first magnetic layer 23 is antiparallel to the positive direction of the Y axis. In a state where external magnetic field 601 is not applied, magnetization direction 211 of pinned layer 21 is parallel to the positive direction of the Y axis. 3

In the present embodiment, in a state where external magnetic field 601 is not applied, angular difference θ between magnetization direction 231 of first magnetic layer 23 and magnetization direction 241 of free layer 24 is set to 90°. That is, in a state where external magnetic field 601 is not applied, magnetization direction 211 of pinned layer 21 is orthogonal to magnetization direction 241 of free layer 24 when viewed in the lamination direction (Z-axis direction DR3). In a state where external magnetic field 601 is not applied, resistance value R of magnetic sensor element 2 is R0 from Equation (1) above.

Figure 4:
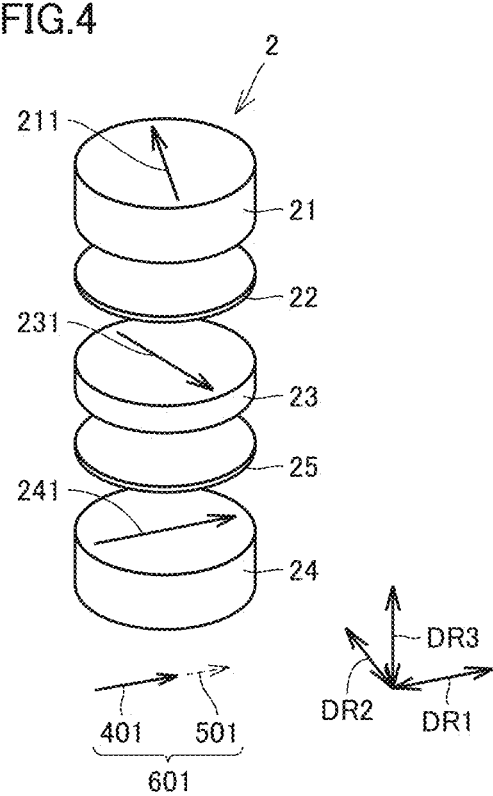
FIG. 4 is an exploded perspective view schematically illustrating the configuration of the magnetic sensor element according to the first embodiment in a state where an external magnetic field is applied to the magnetic sensor element.

In FIG. 4, external magnetic field 601 parallel to the positive direction of the X axis is applied to magnetic sensor element 2 as a magnetic field from the outside. For example, external magnetic field 601 of 50 Oe (1000/(4π) A/m) is applied to magnetic sensor element 2. Magnetization direction 211 of pinned layer 21 and magnetization direction 231 of first magnetic layer 23 are changed by external magnetic field 601. Specifically, magnetization direction 211 of pinned layer 21 and magnetization direction 231 of first magnetic layer 23 rotate in X-axis direction DR1.

More specifically, pinned layer 21 has a single magnetic domain because magnetization direction 211 of pinned layer 21 is fixed. Therefore, the magnetization of pinned layer 21 with respect to external magnetic field 601 parallel to X-axis direction DR1 occurs as the rotation of magnetization direction 211. In other words, when external magnetic field 601 in the direction (X-axis direction DR1) orthogonal to magnetization direction 211 of pinned layer 21 is applied to pinned layer 21, magnetization direction 211 of pinned layer 21 rotates. Similar to pinned layer 21, magnetization direction 231 of first magnetic layer 23 rotates when external magnetic field 601 is applied to first magnetic layer 23. Since the direction of magnetization easy axis of free layer 24 is parallel to the direction of external magnetic field 601, magnetization direction 241 of free layer 24 remains fixed in X-axis direction DRI (the direction of external magnetic field 601).

Note that, since the anisotropic magnetic field of pinned layer 21 is different from the anisotropic magnetic field of first magnetic layer 23, the ease of rotation of magnetization direction 211 of pinned layer 21 is different from the ease of rotation of magnetization direction 231 of first magnetic layer 23. Preferably, magnetization direction 231 of first magnetic layer 23 is more easily rotated than magnetization direction 211 of pinned layer 21.

As described above, when external magnetic field 601 is applied to magnetic sensor element 2, magnetization direction 211 of pinned layer 21 and magnetization direction 231 of first magnetic layer 23 rotate, and magnetization direction 241 of free layer 24 does not rotate. Therefore, angular difference θ between magnetization direction 231 of first magnetic layer 23 and magnetization direction 241 of free layer 24 is smaller than 90°. Thus, resistance value R of magnetic sensor element 2 is smaller than R0 from Equation (1).

Figure 5:
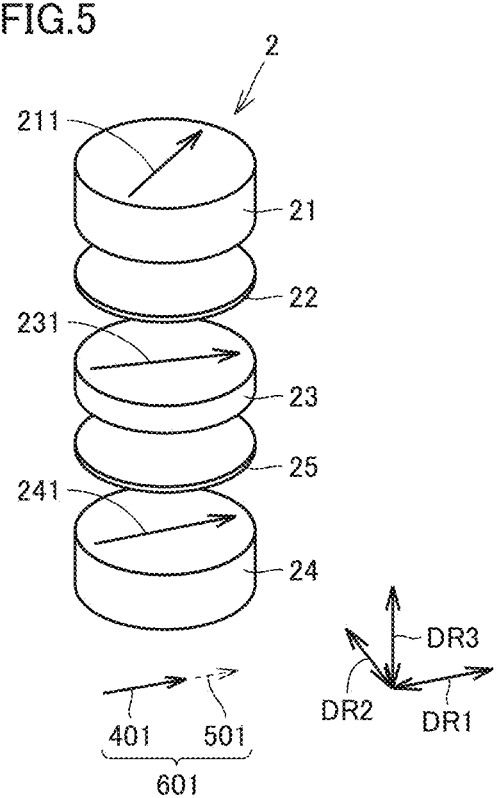
FIG. 5 is an exploded perspective view schematically illustrating the configuration of the magnetic sensor element according to the first embodiment in a state where an external magnetic field larger than the external magnetic field in FIG. 4 is applied to the magnetic sensor element.

In FIG. 5, external magnetic field 601 larger than that illustrated in FIG. 4 is applied to magnetic sensor element 2. As the magnetic field intensity of external magnetic field 601 increases, first magnetic layer 23 and free layer 24 rotate. As a result, magnetization direction 231 of first magnetic layer 23 coincides with X-axis direction DR1 (the direction of external magnetic field 601). In addition, magnetization direction 231 of first magnetic layer 23 and magnetization direction 241 of free layer 24 become parallel to each other. Thus, resistance value R of magnetic sensor element 2 is R0/(1+α) from Equation (1). Note that resistance value R is the smallest when magnetization direction 231 of first magnetic layer 23 and magnetization direction 241 of free layer 24 become parallel to each other.

As described above, magnetic sensor element 2 is configured such that resistance value R decreases as external magnetic field 601 applied to magnetic sensor element 2 increases from 0 Oe. In addition, magnetic sensor element 2 is configured such that resistance value R decreases as external magnetic field 601 applied to magnetic sensor element 2 decreases from 0 Oe. In other words, magnetic sensor element 2 is configured such that resistance value R is maximized when external magnetic field 601 is 0 Oe, and resistance value R decreases as external magnetic field 601 is away from 0 Oe. The resistance value of magnetic sensor element 2 has a symmetrical characteristic about 0 Oe with respect to external magnetic field 601.

Figure 6:
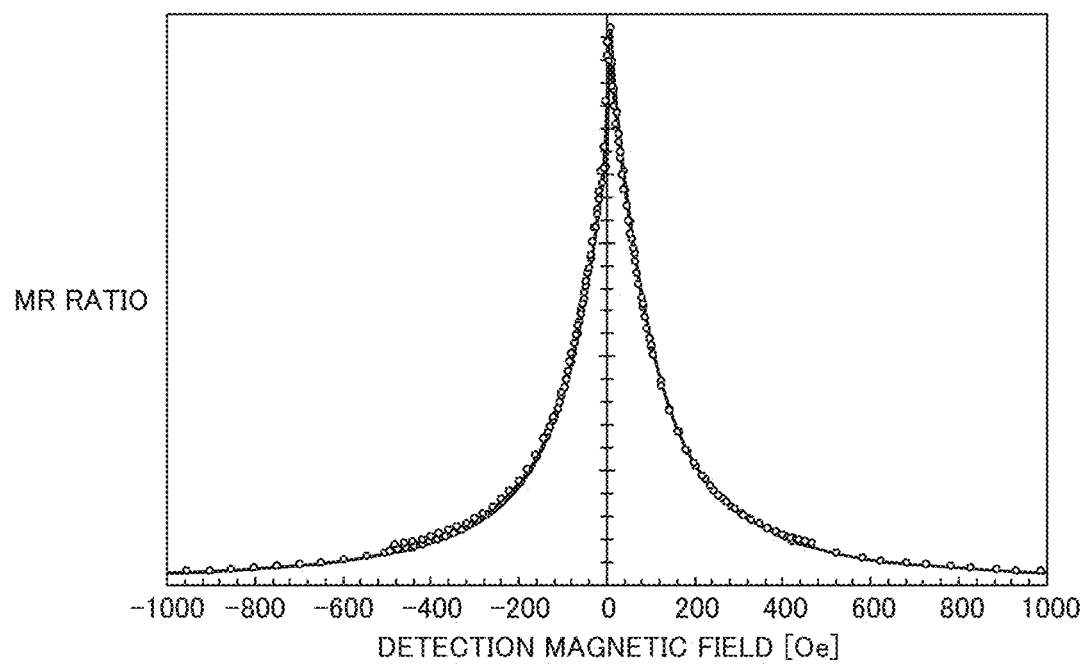
FIG. 6 is a graph schematically illustrating a relationship between a detection magnetic field and an MR ratio in a case where a bias magnetic field is not applied to the magnetic sensor element according to the first embodiment.

Next, the operation by bias magnetic field 401 will be described with reference to FIGS. 6 and 7.

Detection magnetic field 501 is a signal having an amplitude around 0 Oe. The amplitude of detection magnetic field 501 is, for example, 5 Oe. Therefore, if the resistance value of magnetic sensor element 2 is maximized when detection magnetic field 501 is 0 Oe because bias magnetic field 401 is not applied to magnetic sensor element 2, two detection magnetic fields 501 that are positive and negative may correspond to one resistance value within the amplitude of detection magnetic field 501 as illustrated in FIG. 6. Thus, in a case where the resistance value of magnetic sensor element 2 is maximized when detection magnetic field 501 is 0 Oe because bias magnetic field 401 is not applied to magnetic sensor element 2, detection magnetic field 501 may not be accurately detected.

Figure 7:
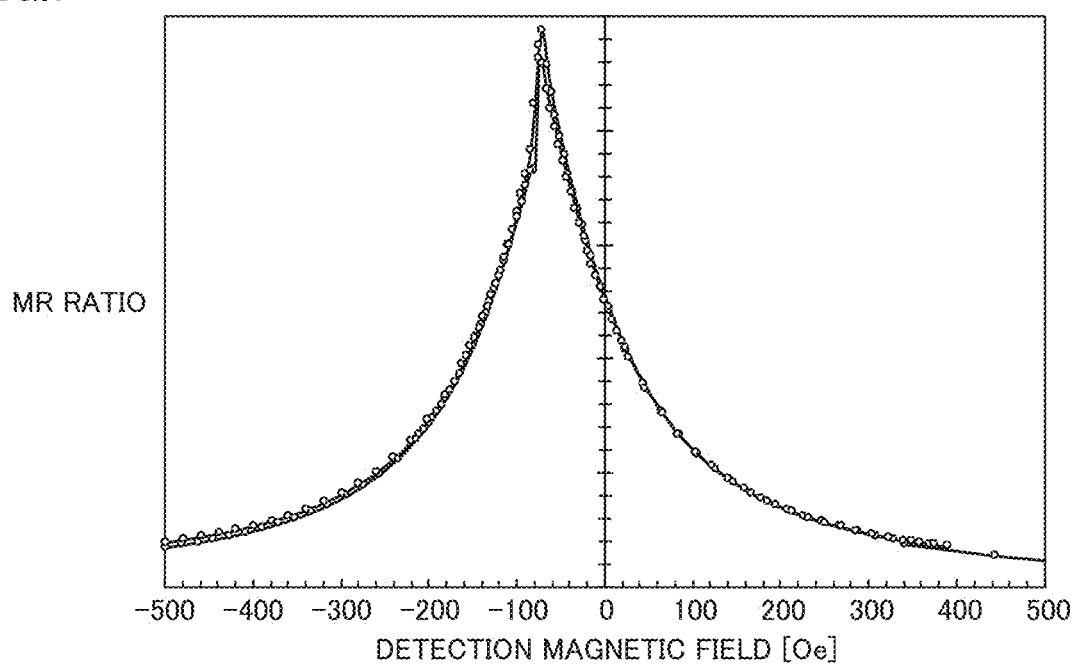
FIG. 7 is a graph schematically illustrating a relationship between a detection magnetic field and an MR ratio in a case where a bias magnetic field of 80 Oe is applied to the magnetic sensor element according to the first embodiment.

On the other hand, in the present embodiment, bias magnetic field 401 is applied to magnetic sensor element 2, whereby the magnetic field-resistance characteristic of magnetic sensor element 2 is shifted in the negative direction by the magnetic field intensity of bias magnetic field 401 as illustrated in FIG. 7. In other words, the magnetic field intensity at which resistance value R of magnetic sensor element 2 is maximized is shifted in the negative direction from 0 Oe by the magnetic field intensity of bias magnetic field 401. The magnetic field intensity of bias magnetic field 401 is larger than the amplitude of detection magnetic field 501. As a result, the intensity of detection magnetic field 501 corresponds to the resistance value of magnetic sensor element 2 on a one-to-one basis.

The magnetic field intensity of bias magnetic field 401 is, for example, 80 Oe. In a case where the magnetic field intensity of bias magnetic field 401 is 80 Oe, the resistance value of magnetic sensor element 2 is maximized when the magnetic field intensity of detection magnetic field 501 is −80 Oe. In a case where the magnetic field intensity of bias magnetic field 401 is 80 Oe, a change in the resistance value of magnetic sensor element 2 is large in a range where the magnetic field intensity of detection magnetic field 501 is, for example, greater than or equal to 20 Oe and less than or equal to 150 Oe. That is, in a case where the magnetic field intensity of bias magnetic field 401 is 80 Oe, the sensitivity of magnetic sensor element 2 is high in a range where the magnetic field intensity of detection magnetic field 501 is greater than or equal to 20 Oe and less than or equal to 150 Oe.

Figure 9:
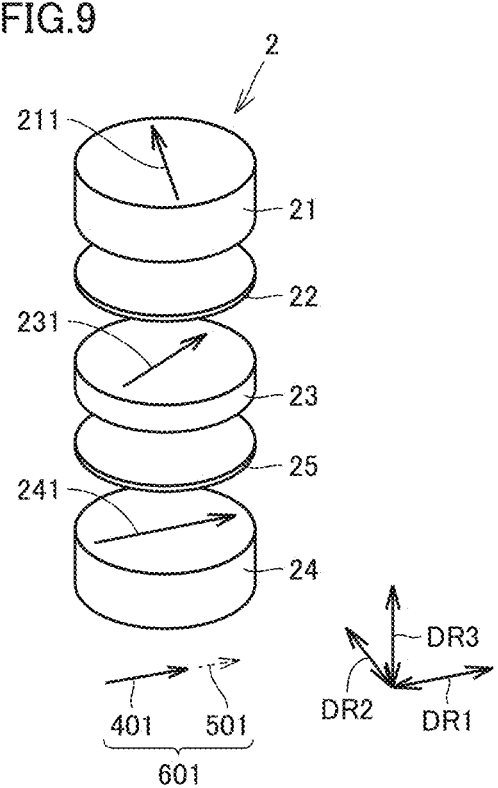
FIG. 9 is an exploded perspective view schematically illustrating the configuration of the magnetic sensor element according to the modification of the first embodiment in a state where an external magnetic field is applied to the magnetic sensor element.
Figure 10:
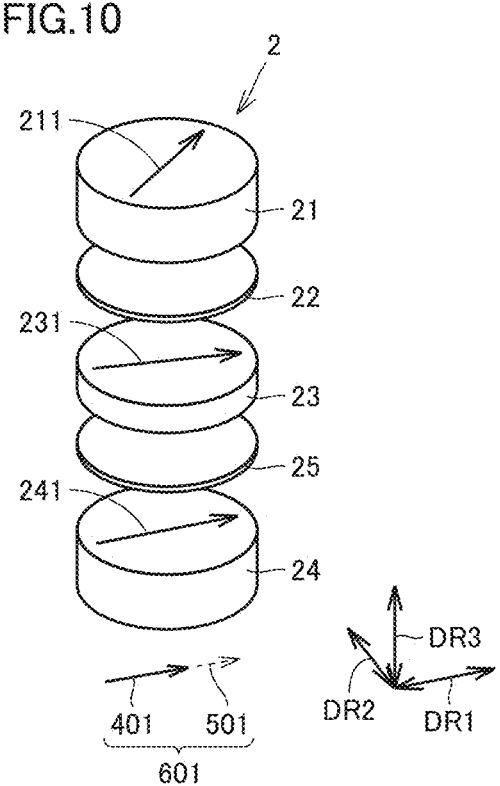
FIG. 10 is an exploded perspective view schematically illustrating the configuration of the magnetic sensor element according to the modification of the first embodiment in a state where an external magnetic field larger than the external magnetic field in FIG. 9 is applied to the magnetic sensor element.

Next, a configuration of magnetic sensor element 2 according to a modification of the first embodiment will be described with reference to FIGS. 8 to 10.

Figure 8:
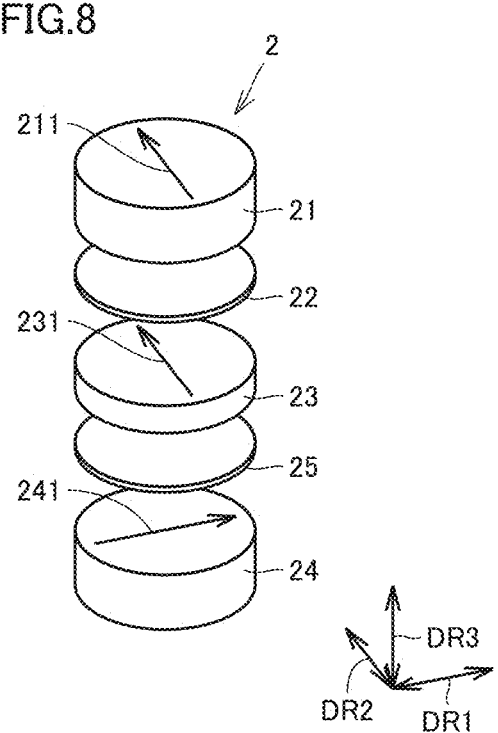
FIG. 8 is an exploded perspective view schematically illustrating the configuration of a magnetic sensor element according to a modification of the first embodiment in a state where an external magnetic field is not applied to the magnetic sensor element.

In magnetic sensor element 2 according to the modification of the first embodiment, magnetization direction 231 of first magnetic layer 23 is the same as (parallel to) magnetization direction 211 of pinned layer 21 in a state where external magnetic field 601 is not applied, as illustrated in FIG. 8. Even in a case where magnetization direction 231 of first magnetic layer 23 is the same as (parallel to) magnetization direction 211 of pinned layer 21 in a state where external magnetic field 601 is not applied, magnetization direction 231 of first magnetic layer 23 becomes parallel to X-axis direction DR1 by external magnetic field 601 as in a case where magnetization direction 231 of first magnetic layer 23 is opposite (antiparallel) to magnetization direction 211 of pinned layer 21, as illustrated in FIGS. 8 to 10.

Next, effects of the present embodiment will be described.

In magnetic sensor element 2 according to the present embodiment, pinned layer 21 and first magnetic layer 23 are coupled by indirect exchange interaction as illustrated in FIG. 3. This configuration can increase the intensity of the applied magnetic field necessary for the rotation of magnetization direction 231 of first magnetic layer 23 relative to the intensity of the anisotropic magnetic field which is the intensity of the applied magnetic field when free layer 24 rotates alone. Therefore, the upper limit of the magnetic field intensity measurable by magnetic sensor element 2 can be increased relative to the anisotropic magnetic field intensity of free layer 24. Accordingly, the dynamic range can be sufficiently increased.

First magnetic layer 23 and free layer 24 hold tunnel insulating film 25 therebetween as illustrated in FIG. 3. Therefore, magnetic sensor element 2 can be formed as a spin-valve TMR element. Accordingly, the sensitivity of magnetic sensor element 2 is improved.

As illustrated in FIG. 3, magnetization direction 231 of first magnetic layer 23 is either the same as or opposite to magnetization direction 211 of pinned layer 21 in a state where external magnetic field 601 (see FIG. 4) is not applied. Therefore, in a state where external magnetic field 601 is not applied, the coupling strength due to the indirect exchange interaction between pinned layer 21 and first magnetic layer 23 can be increased. Accordingly, the dynamic range can be further increased.

As illustrated in FIG. 3, in a state where external magnetic field 601 (see FIG. 4) is not applied, magnetization direction 211 of pinned layer 21 is orthogonal to magnetization direction 241 of free layer 24 when viewed in the lamination direction (Z-axis direction DR3). This can increase angular difference θ between magnetization direction 211 of pinned layer 21 and magnetization direction 241 of free layer 24 in a state where external magnetic field 601 is not applied. Therefore, the intensity of external magnetic field 601 necessary for setting magnetization direction 211 of pinned layer 21 to be the same as magnetization direction 241 of free layer 24 can be increased. Accordingly, the dynamic range can be further increased.

The effect of magnetic sensor element 2 according to the present embodiment will be described while comparing magnetic sensor element 2 according to the present embodiment with a magnetic sensor element according to a comparative example to which bias magnetic field 401 orthogonal to detection magnetic field 501 is applied. Note that the magnetic sensor element according to the comparative example has a configuration similar to that of magnetic sensor element 2 according to the present embodiment unless otherwise specified.

Figure 11:
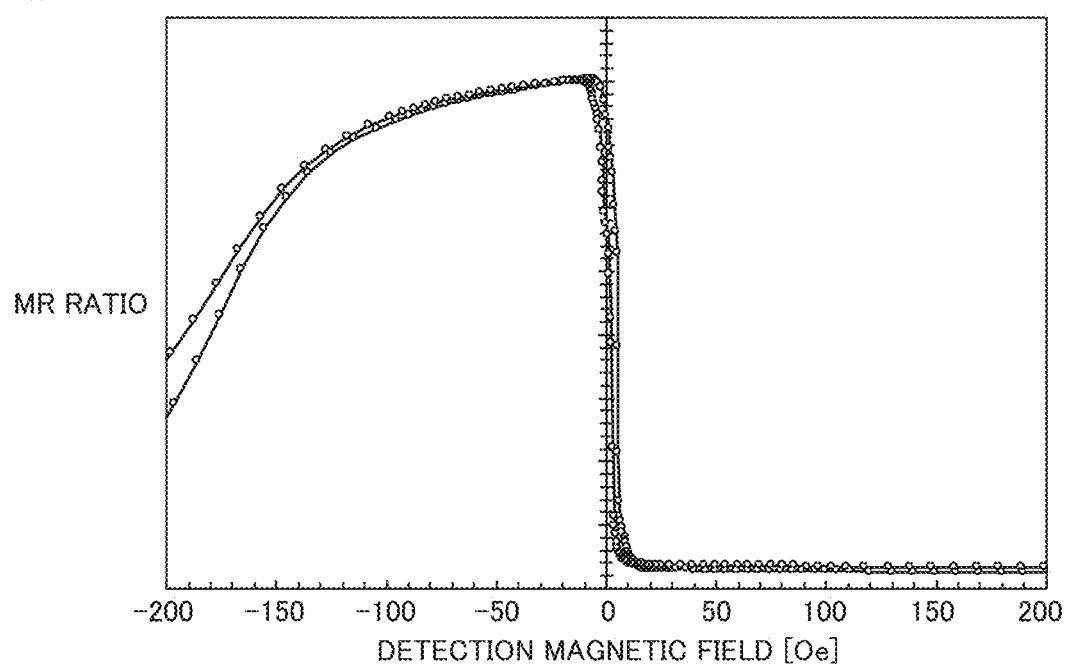
FIG. 11 is a graph schematically illustrating a relationship between a detection magnetic field and an MR ratio in a case where a bias magnetic field is not applied to a magnetic sensor element according to a comparative example.

External magnetic field 601 along Y-axis direction DR2 is applied to the magnetic sensor element according to the comparative example. In the magnetic sensor element according to the comparative example, the magnetization direction of first magnetic layer 23 transitions from an antiparallel state to a parallel state with an increase in the intensity of external magnetic field 601, but remains antiparallel in a range where the intensity of external magnetic field 601 is lower than a certain intensity as illustrated in FIG. 11. Therefore, the resistance value of magnetic sensor element 2 is determined by magnetization direction 241 of free layer 24. That is, the range of the magnetic field intensity where the resistance value of magnetic sensor element 2 changes is determined by the anisotropic magnetic field intensity of free layer 24. The range of the magnetic field intensity determined by the anisotropic magnetic field intensity of free layer 24 is, for example, greater than or equal to −5 Oe and less than or equal to 5 Oe. Therefore, when external magnetic field 601 greater than or equal to 5 Oe is applied to magnetic sensor element 2, the output of magnetic sensor element 2 may be saturated. The output of detection magnetic field 501 having 5 Oe or more along Y-axis direction DR2 can be saturated. Furthermore, when bias magnetic field 401 having 5 Oe or more along Y-axis direction DR2 is applied, the output may be saturated regardless of the direction of detection magnetic field 501.

On the other hand, in the present embodiment, external magnetic field 601 along X-axis direction DR1 is applied to magnetic sensor element 2 as illustrated in FIGS. 4 and 7. Therefore, magnetization direction 211 of pinned layer 21 and magnetization direction 231 of first magnetic layer 23 along Y-axis direction DR2 can be gradually changed to extend along X-axis direction DR1 with respect to an increase in the magnetic field intensity of bias magnetic field 401 along X-axis direction DR1. Thus, magnetization direction 231 of first magnetic layer 23 and magnetization direction 241 of free layer 24 can be gradually changed. As a result, the resistance of magnetic sensor element 2 can also be gradually changed. Accordingly, it is possible to increase the external magnetic field which is necessary until the change in resistance of magnetic sensor element 2 reaches the upper limit. That is, the dynamic range of magnetic sensor element 2 can be increased.

Furthermore, in the comparative example, free layer 24 is divided into a plurality of magnetic domains in the 0 Oe magnetic field having the highest sensitivity. Therefore, the resistance change with respect to the change in magnetic field in the measurement range is caused by the change in the magnetic domain structure of free layer 24. A hysteresis may occur due to a change in the magnetic domain structure. Therefore, a hysteresis may also occur in the output of magnetic sensor 100.

On the other hand, in the present embodiment, first magnetic layer 23 and free layer 24 have a single magnetic domain and the resistance value is determined by the rotation of magnetization direction 231 of first magnetic layer 23, and thus, an occurrence of hysteresis can be prevented.

Second Embodiment

Next, a configuration of magnetic sensor element 2 according to a second embodiment will be described with reference to FIGS. 12 and 13. The second embodiment has the same configuration and effects as those of the first embodiment described above unless otherwise specified. Therefore, the same components as those in the first embodiment are denoted by the same reference numerals, and the description thereof will not be repeated.

Figure 12:
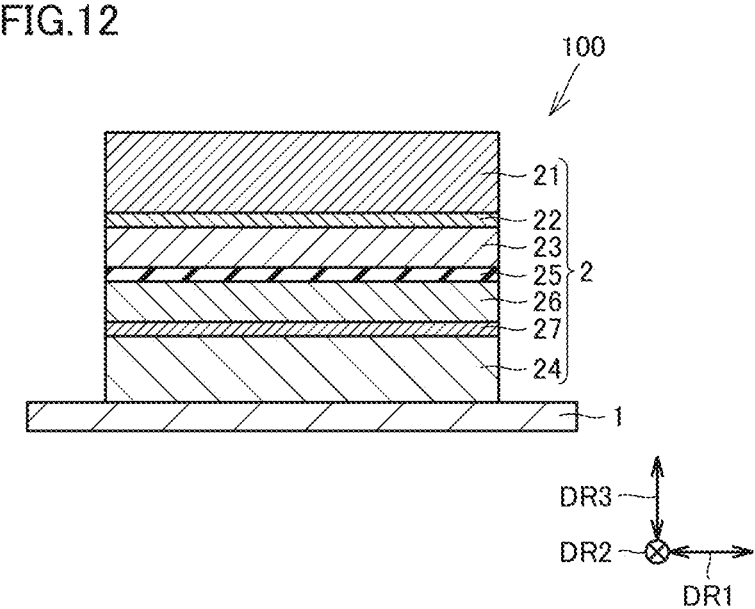
FIG. 12 is a cross-sectional view schematically illustrating a configuration of a magnetic sensor according to a second embodiment.
Figure 13:
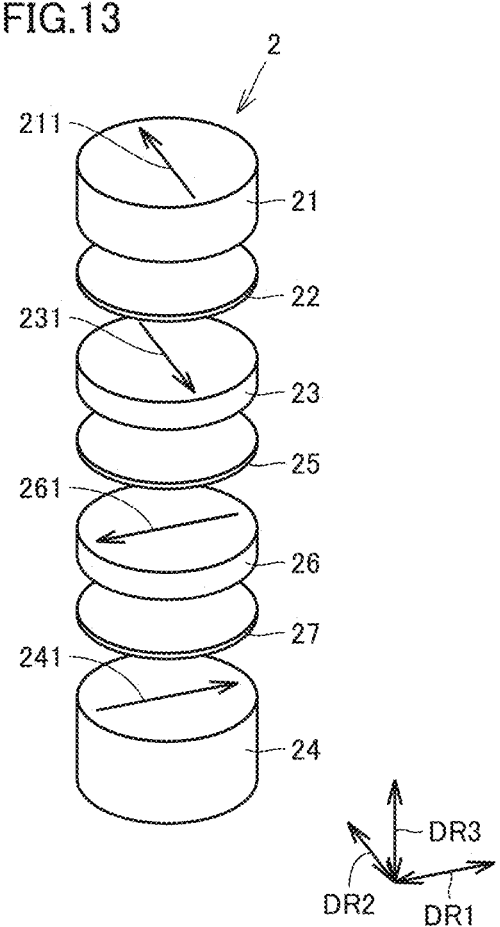
FIG. 13 is an exploded perspective view schematically illustrating the configuration of a magnetic sensor element according to the second embodiment in a state where an external magnetic field is not applied to the magnetic sensor element.

As illustrated in FIGS. 12 and 13, magnetic sensor element 2 according to the present embodiment further includes a second magnetic layer 26 and a second non-magnetic layer 27. Pinned layer 21, first non-magnetic layer 22, first magnetic layer 23, tunnel insulating film 25, second magnetic layer 26, second non-magnetic layer 27, and free layer 24 are laminated in this order.

Second magnetic layer 26 is disposed on the side opposite to pinned layer 21 with respect to first magnetic layer 23. Second magnetic layer 26 holds tunnel insulating film 25 with first magnetic layer 23. Second magnetic layer 26 holds second non-magnetic layer 27 with free layer 24. The material of second magnetic layer 26 may be the same as the material of first magnetic layer 23. The material of second magnetic layer 26 is, for example, cobalt iron boron (CoFeB) or the like.

A magnetization direction 261 of second magnetic layer 26 is opposite to magnetization direction 241 of free layer 24. Magnetization direction 261 of second magnetic layer 26 is directed in the negative direction of X-axis direction DR1.

Second non-magnetic layer 27 is in contact with and sandwiched between free layer 24 and second magnetic layer 26. The material of second non-magnetic layer 27 may be the same as the material of first non-magnetic layer 22. The material of first non-magnetic layer 22 is, for example, ruthenium (Ru). First non-magnetic layer 22 is desirably made of a material that causes indirect exchange interaction on the component (free layer 24 and second magnetic layer 26) holding first non-magnetic layer 22.

The operation of magnetic sensor element 2 according to the second embodiment will be described with reference to FIGS. 13 to 16.

The resistance value of magnetic sensor element 2 according to the present embodiment is determined by angular difference θ between magnetization direction 231 of first magnetic layer 23 and magnetization direction 261 of second magnetic layer 26. In a state where external magnetic field 601 is not applied, angular difference θ between magnetization direction 231 of first magnetic layer 23 and magnetization direction 261 of second magnetic layer 26 is 90° as illustrated in FIG. 13, and thus, resistance value R is R0 according to Equation (1).

Figure 14:
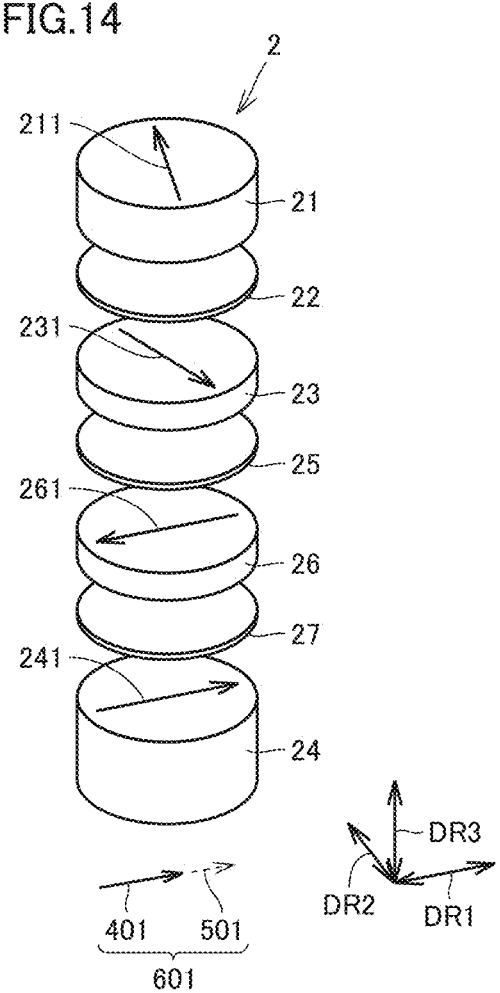
FIG. 14 is an exploded perspective view schematically illustrating the configuration of the magnetic sensor element according to the second embodiment in a state where an external magnetic field is applied to the magnetic sensor element.

Bias magnetic field 401 (external magnetic field 601) of, for example, 50 Oe is applied to magnetic sensor element 2 as illustrated in FIG. 14. Even in a state where bias magnetic field 401 of 50 Oe is applied, magnetization direction 261 of second magnetic layer 26 is maintained to be directed in the negative direction of the X axis. This is because second magnetic layer 26 coupled by indirect exchange interaction with free layer 24 having the magnetization direction along external magnetic field 601 with second non-magnetic layer 27 therebetween behaves as an easy axis with respect to external magnetic field 601. In other words, second magnetic layer 26 has a large hysteresis with respect to magnetization reversal. Therefore, the magnetization direction of second magnetic layer 26 rotates later than the magnetization direction of first magnetic layer 23.

On the other hand, magnetization direction 231 of first magnetic layer 23 rotates in the direction along external magnetic field 601 (X-axis direction DR1) with an increase in external magnetic field 601. Therefore, angular difference θ between magnetization direction 231 of first magnetic layer 23 and magnetization direction 261 of second magnetic layer 26 increases. Accordingly, resistance value R of magnetic sensor element 2 is larger than R0.

Figure 15:
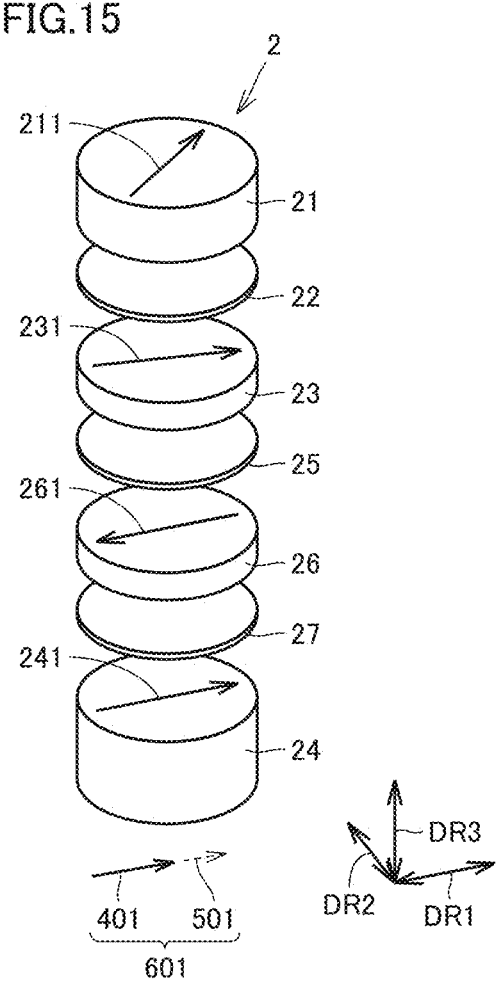
FIG. 15 is an exploded perspective view schematically illustrating the configuration of the magnetic sensor element according to the second embodiment in a state where an external magnetic field larger than the external magnetic field in FIG. 14 is applied to the magnetic sensor element.

Subsequently, bias magnetic field 401 (external magnetic field 601) of, for example, 300 Oe is applied to magnetic sensor element 2 as illustrated in FIG. 15. As a result, magnetization direction 261 of second magnetic layer 26 rotates in the direction along bias magnetic field 401 (X-axis direction DR1). Thus, angular difference θ between magnetization direction 231 of first magnetic layer 23 and magnetization direction 261 of second magnetic layer 26 is 180°. Accordingly, resistance value R is $R0/(1-\alpha)$ which is the maximum according to Equation (1).

Figure 16:
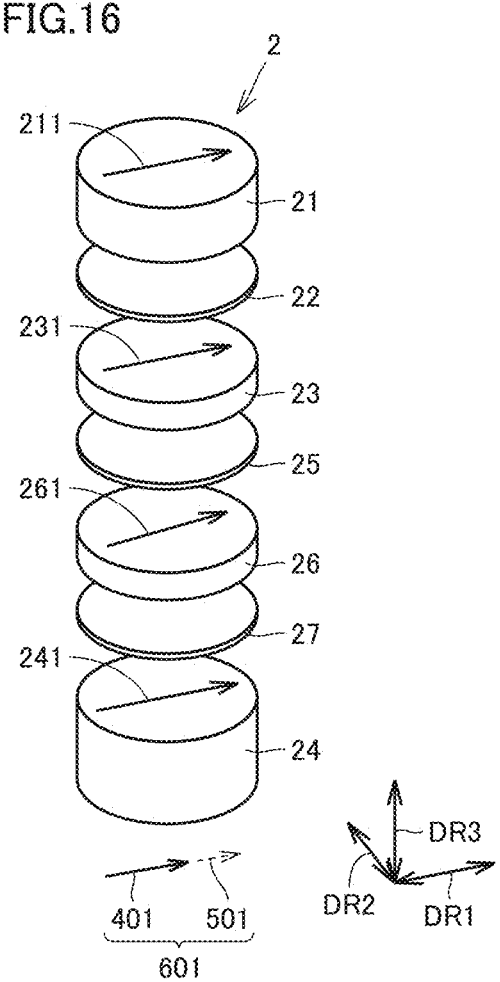
FIG. 16 is an exploded perspective view schematically illustrating the configuration of the magnetic sensor element according to the second embodiment in a state where an external magnetic field larger than the external magnetic field in FIG. 15 is applied to the magnetic sensor element.

Subsequently, bias magnetic field 401 (external magnetic field 601) greater than 300 Oe, for example, is applied to magnetic sensor element 2 as illustrated in FIG. 16. As a result, magnetization direction 261 of second magnetic layer 26 becomes parallel to the bias magnetic field 401. All of magnetization direction 231 of first magnetic layer 23, magnetization direction 241 of free layer 24, and magnetization direction 261 of second magnetic layer 26 are parallel to bias magnetic field 401.

In the process in which magnetization direction 261 of second magnetic layer 26 rotates along external magnetic field 601, angular difference θ between magnetization direction 231 of first magnetic layer 23 and magnetization direction 261 of second magnetic layer 26 decreases. Therefore, resistance value R of magnetic sensor element 2 decreases. Finally, angular difference θ becomes 0°, so that resistance value R becomes $R0/(1+\alpha)$ which is the minimum.

Figure 17:
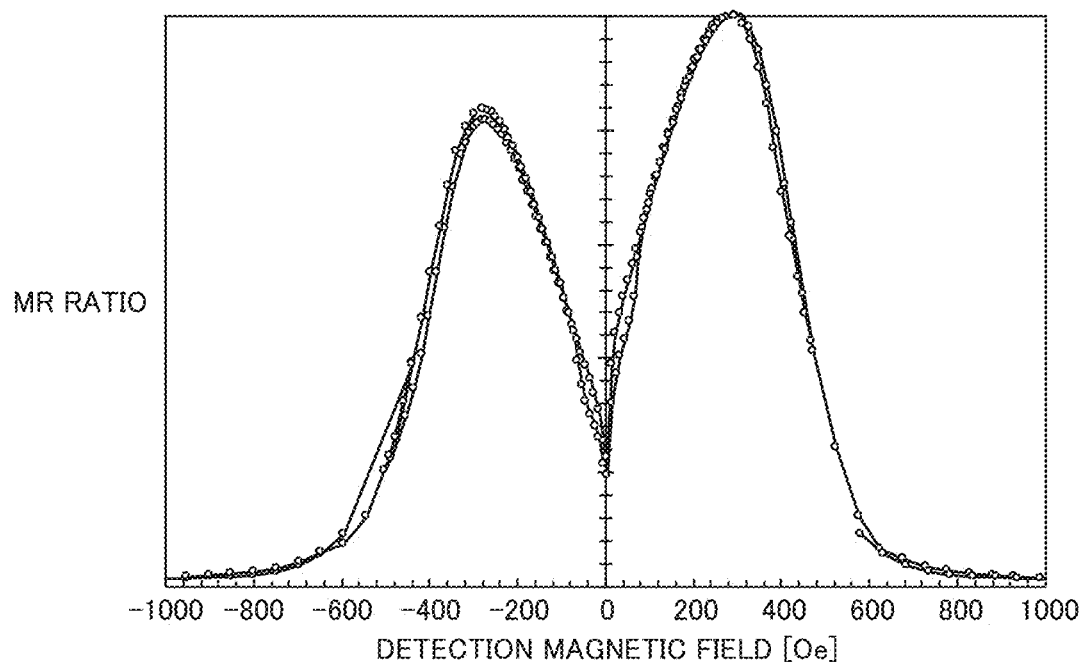
FIG. 17 is a graph schematically illustrating a relationship between a detection magnetic field and an MR ratio in a case where a bias magnetic field is not applied to the magnetic sensor element according to the second embodiment.

Specifically, the resistance value of magnetic sensor element 2 increases within a range from 0 Oe to 300 Oe as illustrated in FIG. 17. In addition, the resistance value of magnetic sensor element 2 decreases within a range from 300 Oe to 700 Oe. The resistance value of magnetic sensor element 2 increases within a range from 0 Oe to −300 Oe. In addition, the resistance value of magnetic sensor element 2 decreases within a range from −300 Oe to −700 Oe. Therefore, magnetic sensor element 2 has M-shaped characteristics.

Figure 18:
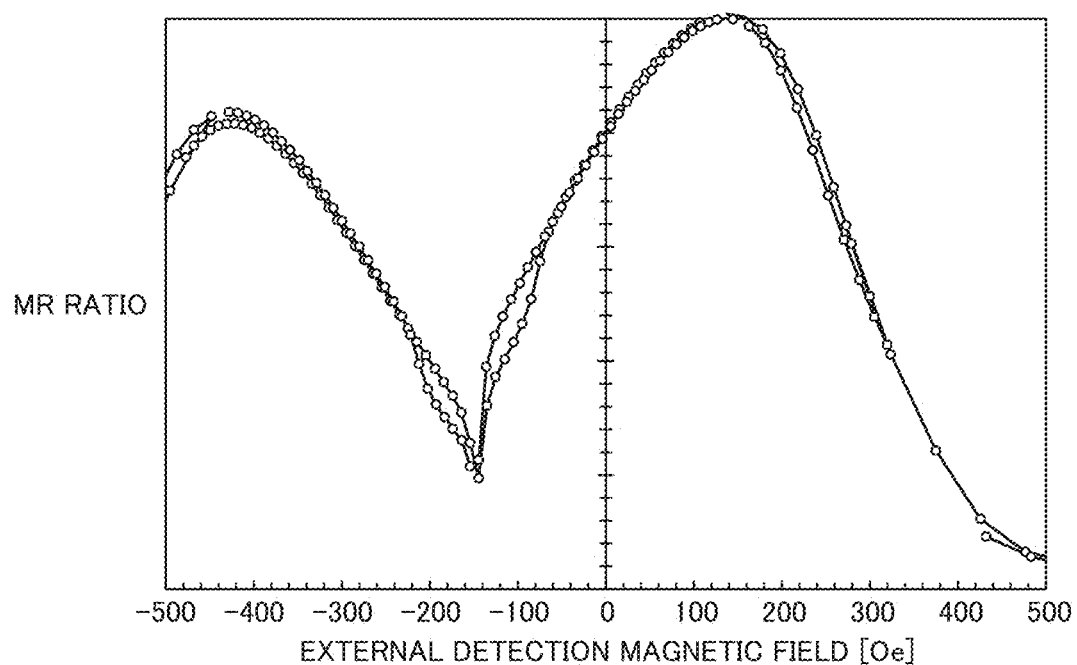
FIG. 18 is a graph schematically illustrating a relationship between a detection magnetic field and an MR ratio in a case where a bias magnetic field of 150 Oe is applied to the magnetic sensor element according to the second embodiment.

In the present embodiment, bias magnetic field 401 is also applied to magnetic sensor element 2 during operation of magnetic sensor element 2 as illustrated in FIG. 18, as in the first embodiment. For example, bias magnetic field 401 of 150 Oe is applied to magnetic sensor element 2. Note that, in a case where bias magnetic field 401 of 150 Oe is applied, second magnetic layer 26 behaves as having an easy axis within a region from 300 Oe to 700 Oe, and thus, has a large hysteresis. Therefore, the region from 300 Oe to 700 Oe is not suitable for use of magnetic sensor element 2.

Note that, when first non-magnetic layer 22 has a thickness that couples free layer 24 and first magnetic layer 23 by indirect exchange interaction in a state in which magnetization direction 241 of free layer 24 and magnetization direction 231 of first magnetic layer 23 are the same (parallel to each other), second magnetic layer 26 operates in the same manner as free layer 24. In other words, when first non-magnetic layer 22 has a thickness that couples free layer 24 and first magnetic layer 23 by indirect exchange interaction in a state in which magnetization direction 241 of free layer 24 and magnetization direction 231 of first magnetic layer 23 are the same (parallel to each other), magnetic sensor element 2 operates in the same manner as that in the first embodiment.

Next, effects of the present embodiment will be described.

In magnetic sensor element 2 according to the present embodiment, second magnetic layer 26 holds second non-magnetic layer 27 with free layer 24 as illustrated in FIG. 13. A magnetization direction 261 of second magnetic layer 26 is opposite to magnetization direction 241 of free layer 24. Therefore, the characteristics of a change in resistance value of magnetic sensor element 2 with respect to the application of external magnetic field 601 to magnetic sensor element 2 are opposite to those in the case where second non-magnetic layer 27 and second magnetic layer 26 are not provided (first embodiment). Thus, the characteristics of magnetic sensor element 2 can be greatly changed only by adding an element forming process of adding second non-magnetic layer 27 and second magnetic layer 26.

Third Embodiment

Next, a configuration of magnetic sensor element 2 according to a third embodiment will be described with reference to FIG. 19. The third embodiment has the same configuration and effects as those of the first embodiment described above unless otherwise specified. Therefore, the same components as those in the first embodiment are denoted by the same reference numerals, and the description thereof will not be repeated.

Figure 19:
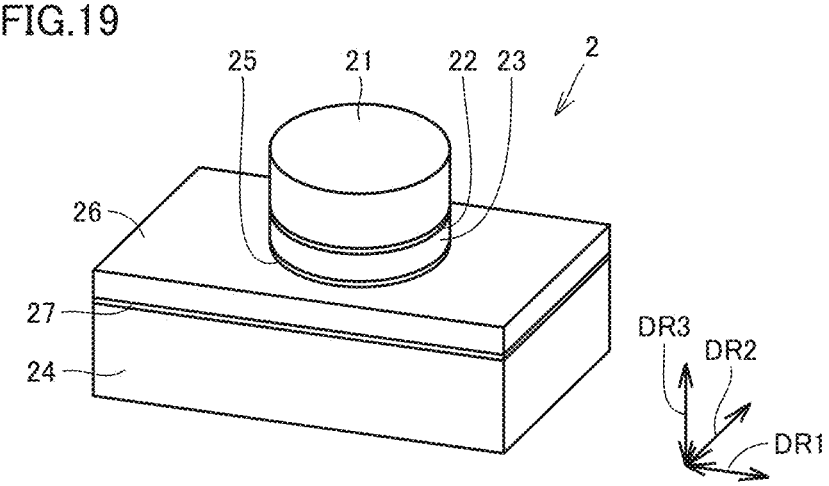
FIG. 19 is a perspective view schematically illustrating a configuration of a magnetic sensor according to a third embodiment.

In magnetic sensor element 2 according to the present embodiment, pinned layer 21, first non-magnetic layer 22, and first magnetic layer 23 have a circular shape as viewed in the direction in which first non-magnetic layer 22 is laminated on pinned layer 21 (Z-axis direction DR3) as illustrated in FIG. 19. Therefore, pinned layer 21 and first magnetic layer 23 have a single magnetic domain in the in-plane direction (X-axis direction DR1 and Y-axis direction DR2) of pinned layer 21 and first magnetic layer 23. In addition, pinned layer 21 and first magnetic layer 23 have a hard axis in the direction (Z-axis direction DR3) perpendicular to the surfaces of pinned layer 21 and first magnetic layer 23. Note that the shape of each of pinned layer 21, first magnetic layer 23, and first non-magnetic layer 22 is not limited to a perfect circle, and may be an ellipse. Alternatively, the shape of each of pinned layer 21, first non-magnetic layer 22, and first magnetic layer 23 may be a rectangle having rounded corners.

Second non-magnetic layer 27, second magnetic layer 26, and free layer 24 have a rectangular shape when viewed in the direction in which first non-magnetic layer 22 is laminated on pinned layer 21 (Z-axis direction DR3). The long side of the rectangle extends along the direction of external magnetic field 601 (see FIG. 4).

The shape of tunnel insulating film 25 may be circular or rectangular when viewed in the direction in which first non-magnetic layer 22 is laminated on pinned layer 21 (Z-axis direction DR3).

Although pinned layer 21 and first magnetic layer 23 are smaller than free layer 24 when viewed in Z-axis direction DR3 in FIG. 19, they may be larger than free layer 24. When pinned layer 21 and first magnetic layer 23 are larger than free layer 24 as viewed in Z-axis direction DR3, magnetic sensor element 2 can be easily formed by a semiconductor process.

In FIG. 19, magnetic sensor element 2 is manufactured by being laminated from the bottom (free layer 24) to the top (pinned layer 21), so that the bottom (free layer 24) is rectangular and the top (pinned layer 21) is circular. When the order of lamination is reversed, it is desirable that the arrangement of the circular components and the rectangular components is also reversed.

Next, effects of the present embodiment will be described.

In magnetic sensor element 2 according to the present embodiment, pinned layer 21 and first magnetic layer 23 have a circular shape as viewed in the direction in which first non-magnetic layer 22 is laminated on pinned layer 21 (Z-axis direction DR3) as illustrated in FIG. 19. Therefore, pinned layer 21 and first magnetic layer 23 have a single magnetic domain in the in-plane direction (X-axis direction DR1 and Y-axis direction DR2) of pinned layer 21 and first magnetic layer 23. Therefore, in the in-plane direction (X-axis direction DR1 and Y-axis direction DR2) of pinned layer 21 and first magnetic layer 23, the ease of rotation of magnetization direction 231 of pinned layer 21 and first magnetic layer 23 with respect to external magnetic field 601 (see FIG. 4) is the same in any direction. Therefore, the hysteresis of magnetic sensor element 2 can be reduced.

The shape of free layer 24 is a rectangle when viewed in the direction in which first non-magnetic layer 22 is laminated on pinned layer 21 (Z-axis direction DR3) as illustrated in FIG. 19. The long side of the rectangle extends along the direction of external magnetic field 601 (see FIG. 4). In general, the aspect ratio of the shape of a magnetic material affects the magnetic properties of the magnetic material. Specifically, the direction of the easy axis of a rectangular magnetic material is along the long side direction. In addition, the direction of the hard axis of the rectangular magnetic material is along the short side direction. Therefore, the rectangular magnetic material is more easily magnetized along the long side direction rather than along the short side direction of the rectangle. Therefore, the coercive force of the magnetic material becomes larger along the long side direction than along the short side direction of the rectangle. In the present embodiment, the long side of the rectangle extends along the direction of external magnetic field 601, whereby free layer 24 has an easy axis along the direction in which external magnetic field 601 is applied. Therefore, the coercive force of free layer 24 increases. Accordingly, magnetization direction 241 of free layer 24 can be further fixed. Thus, magnetization direction 241 of free layer 24 can be stabilized.

Furthermore, in a case where magnetic sensor element 2 further includes second magnetic layer 26, the magnetization reversal of second magnetic layer 26 has a high coercive force by the reversal of the magnetization direction of first magnetic layer 23. Therefore, the measurable region where the resistance value of magnetic sensor element 2 increases can be widened.

Fourth Embodiment

Next, the configurations of magnetic sensor element 2 and magnetic sensor 100 according to a fourth embodiment will be described with reference to FIGS. 20 and 21. The fourth embodiment has the same configuration and effects as those of the third embodiment described above unless otherwise specified. Therefore, the same components as those in the third embodiment are denoted by the same reference numerals, and the description thereof will not be repeated.

Figure 20:
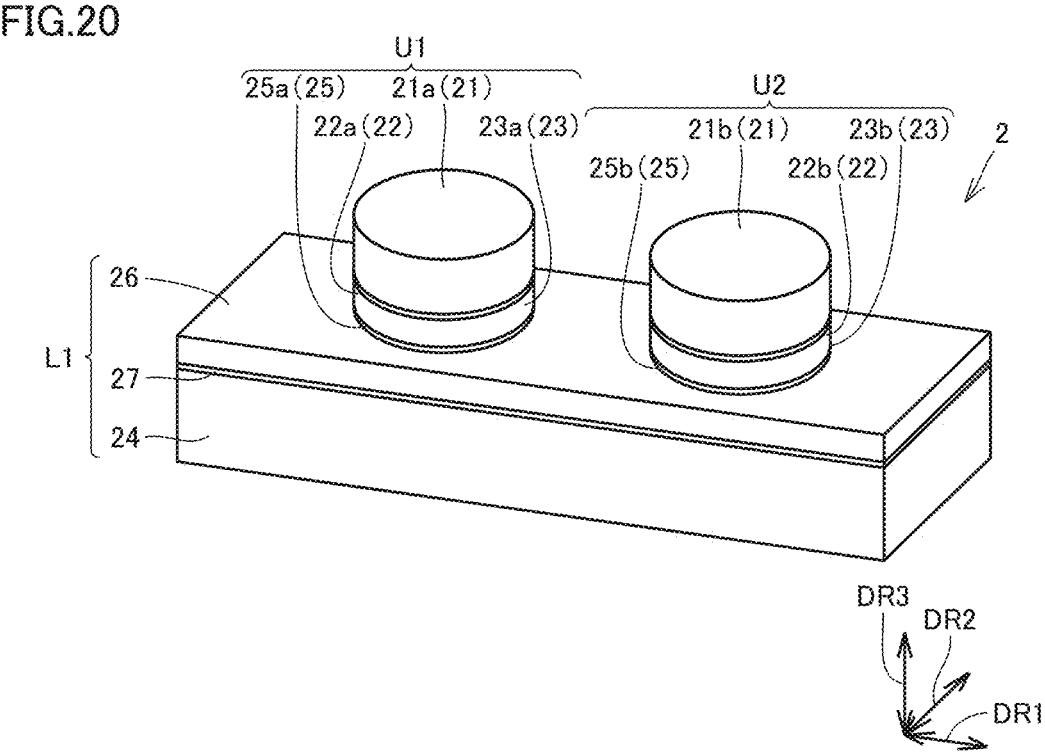
FIG. 20 is a perspective view schematically illustrating a configuration of a magnetic sensor according to a fourth embodiment.

Pinned layer 21 of magnetic sensor element 2 according to the present embodiment includes a first pinned portion 21a and a second pinned portion 21b as illustrated in FIG. 20. First pinned portion 21a and second pinned portion 21b are disposed on the same side with respect to free layer 24. First non-magnetic layer 22 includes a first non-magnetic portion 22a and a second non-magnetic portion 22b. First magnetic layer 23 includes a first magnetic portion 23a and a second magnetic portion 23b. Tunnel insulating film 25 includes a first tunnel insulating portion 25a and a second tunnel insulating portion 25b. First tunnel insulating portion 25a and second tunnel insulating portion 25b are connected to the same surface of second magnetic layer 26. Preferably, first tunnel insulating portion 25a and second tunnel insulating portion 25b are arranged along the longitudinal direction of second non-magnetic layer 27. In this case, first tunnel insulating portion 25a and second tunnel insulating portion 25b are easily disposed on second non-magnetic layer 27.

First pinned portion 21a, first non-magnetic portion 22a, first magnetic portion 23a, and first tunnel insulating portion 25a are laminated in this order. Second pinned portion 21b, second non-magnetic portion 22b, second magnetic portion 23b, and second tunnel insulating portion 25b are laminated in this order. First tunnel insulating portion 25a and second tunnel insulating portion 25b are laminated on second magnetic layer 26.

For convenience of description, first pinned portion 21a, first non-magnetic portion 22a, first magnetic portion 23a, and first tunnel insulating portion 25a which are laminated are referred to as a first upper structure U1. For convenience of description, second pinned portion 21b, second non-magnetic portion 22b, second magnetic portion 23b, and second tunnel insulating portion 25b which are laminated are referred to as a second upper structure U2. For convenience of description, second magnetic layer 26, second non-magnetic layer 27, and free layer 24 which are laminated are referred to as a lower structure L1. Each of first upper structure U1 and second upper structure U2 is disposed on lower structure L1. Although the shape of lower structure L1 in a top view is rectangular, lower structure L1 may partially include a curved shape by over-etching.

Next, the configuration of magnetic sensor 100 according to the fourth embodiment will be described with reference to FIG. 21.

Figure 21:
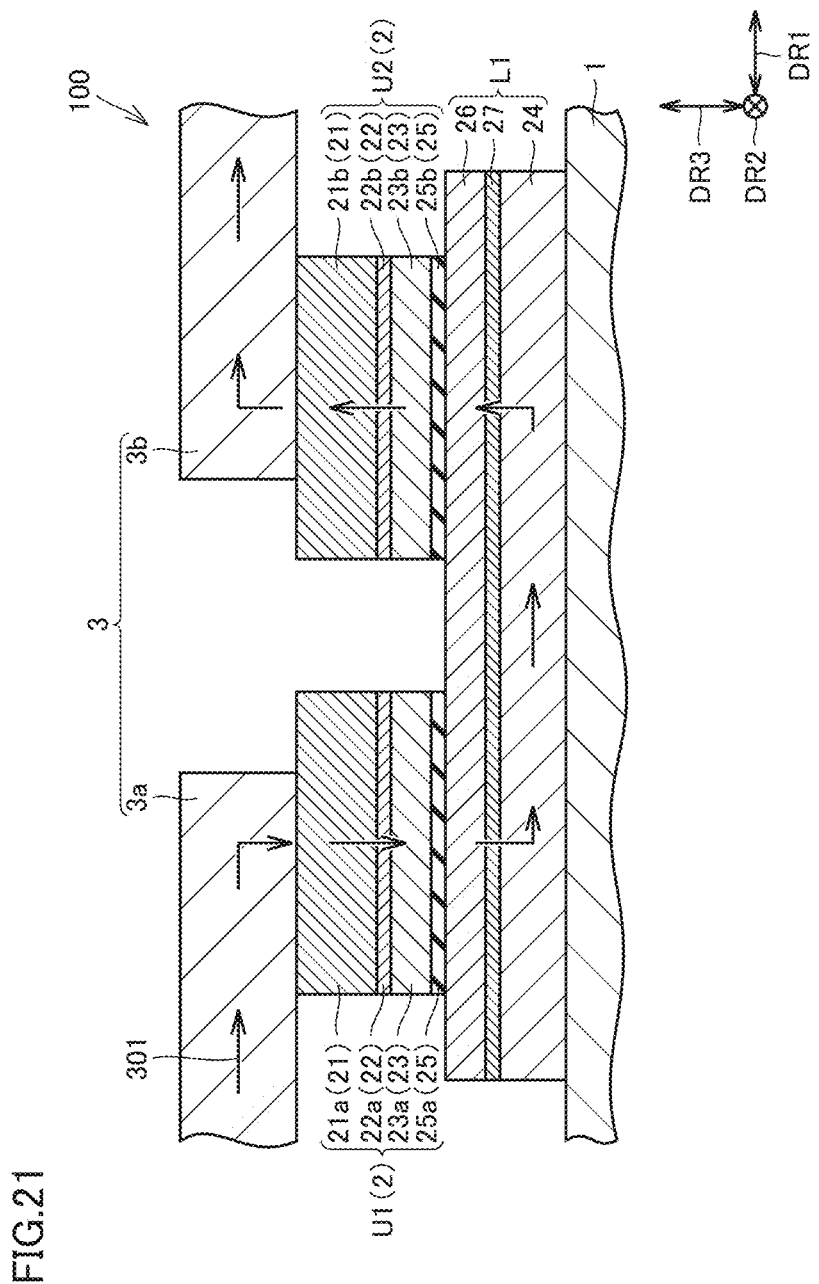
FIG. 21 is a cross-sectional view schematically illustrating the configuration of the magnetic sensor according to the fourth embodiment.

As illustrated in FIG. 21, magnetic sensor 100 includes substrate 1, magnetic sensor element 2, and a wiring member 3. Wiring member 3 includes a first wiring portion 3a and a second wiring portion 3b. First wiring portion 3a is electrically connected to first pinned portion 21a. Second wiring portion 3b is electrically connected to second pinned portion 21b. Magnetic sensor 100 is configured such that a current sequentially flows through first wiring portion 3a, first upper structure U1, lower structure L1, second upper structure U2, and second wiring portion 3b. To this end, first upper structure U1 and second upper structure U2 are electrically connected in series.

In the present embodiment, resistance value R of magnetic sensor element 2 is determined by the relative angle between the magnetization direction of first magnetic portion 23a and magnetization direction 241 of free layer 24 and the relative angle between the magnetization direction of second magnetic portion 23b and magnetization direction 241 of free layer 24. In the present embodiment, the magnetization direction of first magnetic portion 23a and the intensity of second magnetic portion 23b are smaller with respect to the spatial distribution of the intensity of detection magnetic field 501. Therefore, the relative angle between the magnetization direction of first magnetic portion 23a and magnetization direction 241 of free layer 24 and the relative angle between the magnetization direction of second magnetic portion 23b and magnetization direction 241 of free layer 24 are the same. Thus, the resistance value when the current passes through first tunnel insulating portion 25a is the same as the resistance value when the current passes through second tunnel insulating portion 25b. Accordingly, magnetic sensor device 100 according to the present embodiment can provide an effect same as the effect obtained by electrically connecting two magnetic sensor elements 2 in series by one magnetic sensor element 2.

Next, effects of the present embodiment will be described.

In magnetic sensor element 2 according to the present embodiment, first pinned portion 21a and second pinned portion 21b are disposed on the same side with respect to free layer 24 as illustrated in FIG. 20. Therefore, first wiring portion 3a and second wiring portion 3b can be electrically connected to first pinned portion 21a and second pinned portion 21b, respectively, on the same side with respect to free layer 24. Therefore, the number of wiring steps can be reduced as compared with a case where first wiring portion 3a and second wiring portion 3b are electrically connected so as to sandwich magnetic sensor element 2. Thus, cost of magnetic sensor device 100 can be reduced.

More specifically, if an electrode 4 is connected to lower structure L1, wiring member 3 may be electrically connected to lower structure L1 before tunnel insulating film 25 is laminated on lower structure L1. In this case, the film quality of lower structure L1 may be deteriorated due to an increase in the manufacturing process of magnetic sensor element 2, roughening of a wafer surface of lower structure L1 due to the connection of wiring member 3, contamination of lower structure L1 due to the connection of wiring member 3, and the like. In addition, if electrode 4 is connected to lower structure L1, lower structure L1 and pinned layer 21 may be in contact with each other. In this case, it is necessary to further provide a contact region in lower structure L1. As described above, if electrode 4 is connected to lower structure L1, the manufacturing cost of magnetic sensor element 2 increases. On the other hand, in the present embodiment, electrode 4 is connected to each of first pinned portion 21a and second pinned portion 21b, whereby the number of wiring steps can be reduced. Thus, an increase in manufacturing cost of magnetic sensor element 2 can be suppressed.

Fifth Embodiment

Next, the configuration of magnetic sensor 100 according to a fifth embodiment will be described with reference to FIG. 22. The fifth embodiment has the same configuration and effects as those of the fourth embodiment described above unless otherwise specified. Therefore, the same components as those in the fourth embodiment are denoted by the same reference numerals, and the description thereof will not be repeated.

Figure 22:
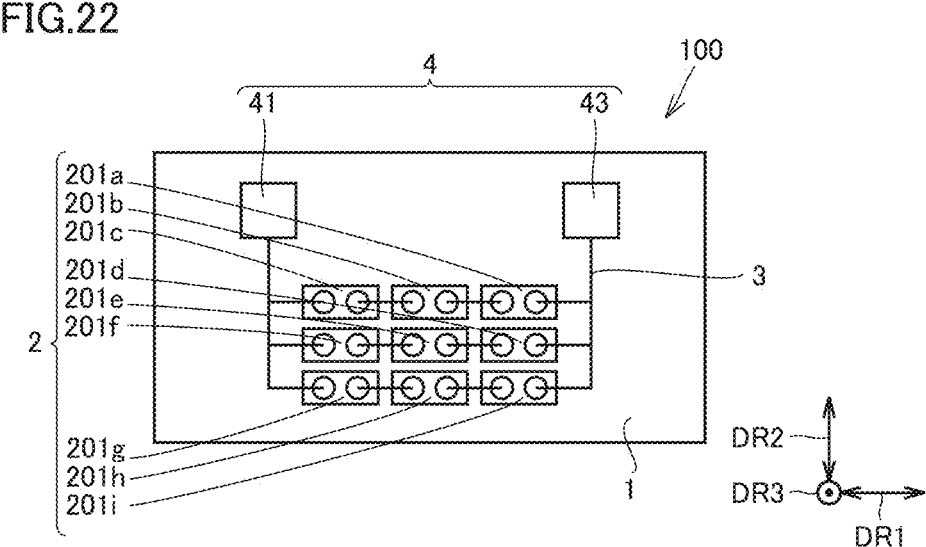
FIG. 22 is a top view schematically illustrating a configuration of a magnetic sensor according to a fifth embodiment.

As illustrated in FIG. 22, magnetic sensor 100 according to the present embodiment includes substrate 1, magnetic sensor element 2, wiring member 3, and electrode 4. A plurality of magnetic sensor elements 2 are provided. The plurality of magnetic sensor elements 2 are connected to substrate 1. The plurality of magnetic sensor elements 2 are electrically connected to each other on substrate 1. That is, the plurality of magnetic sensor elements 2 are configured as an array.

In the present embodiment, first magnetic sensor element 201a to ninth magnetic sensor element 201i are provided. First magnetic sensor element 201a to third magnetic sensor element 201c are disposed along X-axis direction DR1. First magnetic sensor element 201a to third magnetic sensor element 201c are electrically connected in series. Fourth magnetic sensor element 201d to sixth magnetic sensor element 201f are disposed along X-axis direction DR1. Fourth magnetic sensor element 201d to sixth magnetic sensor element 201f are electrically connected in series. Seventh magnetic sensor element 201g to ninth magnetic sensor element 201i are disposed along X-axis direction DR1. Seventh magnetic sensor element 201g to ninth magnetic sensor element 201i are electrically connected in series. First magnetic sensor element 201a to third magnetic sensor element 201c, fourth magnetic sensor element 201d to sixth magnetic sensor element 201f, and seventh magnetic sensor element 201g to ninth magnetic sensor element 201i are disposed along Y-axis direction DR2. First magnetic sensor element 201a to third magnetic sensor element 201c, fourth magnetic sensor element 201d to sixth magnetic sensor element 201f, and seventh magnetic sensor element 201g to ninth magnetic sensor element 201i are electrically connected in parallel to each other. Preferably, the plurality of magnetic sensor elements 2 are disposed such that the longitudinal directions of the plurality of magnetic sensor elements 2 extend in the same direction. Note that the angle, the number, the arrangement, the circuit design by wiring member 3, and the like of magnetic sensor 100 are not limited to those described above. In addition, magnetic sensor elements 2 at, for example, the end of the array may not be electrically connected by wiring member 3.

Electrode 4 includes a first input electrode portion 41 and an output electrode portion 43. Wiring member 3 is connected to each of first input electrode portion 41 and output electrode portion 43. Therefore, the plurality of magnetic sensor elements 2 are wired between first input electrode portion 41 and output electrode portion 43. Magnetic sensor 100 is configured to measure a magnetic change on the basis of a change in resistance of the plurality of magnetic sensor elements 2 between first input electrode portion 41 and output electrode portion 43.

The material of wiring member 3 and electrode 4 is, for example, an aluminum-silicon alloy (Al—Si alloy), copper (Cu), or the like. The material of wiring member 3 and electrode 4 is not limited thereto, and may be thin films having conductivity.

Note that magnetic sensor 100 may be configured to measure a magnetic change on the basis of a change in resistance of a plurality of magnetic sensor elements 2 between four electrodes 4.

Next, the operation of magnetic sensor 100 according to the fifth embodiment will be described.

In the present embodiment, a current flows through each of the plurality of magnetic sensor elements 2. Therefore, magnetic sensor 100 measures detection magnetic field 501 on the basis of the sum of changes in resistance value R of the plurality of magnetic sensor elements 2 due to the external magnetic field. It is to be noted that, since each of the plurality of magnetic sensor elements 2 is sufficiently small with respect to the magnetic field gradient of the external magnetic field, the resistance value based on the relative angle between magnetization direction 231 of first magnetic layer 23 and magnetization direction 241 of free layer 24 can be regarded to be the same in each of the plurality of magnetic sensor elements 2.

Next, effects of the present embodiment will be described.

According to magnetic sensor 100 of the present embodiment, the plurality of magnetic sensor elements 2 are electrically connected to each other on substrate 1 as illustrated in FIG. 22. Therefore, the resistance values of all the plurality of magnetic sensor elements 2 can be averaged by the plurality of magnetic sensor elements 2. The noise included in the current flowing through each of the plurality of magnetic sensor elements 2 is random noise, and thus, the noise included in the current can be reduced by averaging the resistance values. Therefore, noise of the detection magnetic field detected by magnetic sensor 100 can be reduced.

The plurality of magnetic sensor elements 2 are electrically connected to each other on substrate 1 as illustrated in FIG. 22. Therefore, the resistance value of magnetic sensor 100 can be changed by electrically connecting the plurality of magnetic sensor elements 2 in series or in parallel.

Sixth Embodiment

Next, a configuration of magnetic sensor 100 according to a sixth embodiment will be described with reference to FIGS. 23 and 24. The sixth embodiment has the same configuration and effects as those of the fifth embodiment described above unless otherwise specified. Therefore, the same components as those in the fifth embodiment are denoted by the same reference numerals, and the description thereof will not be repeated.

Figure 23:
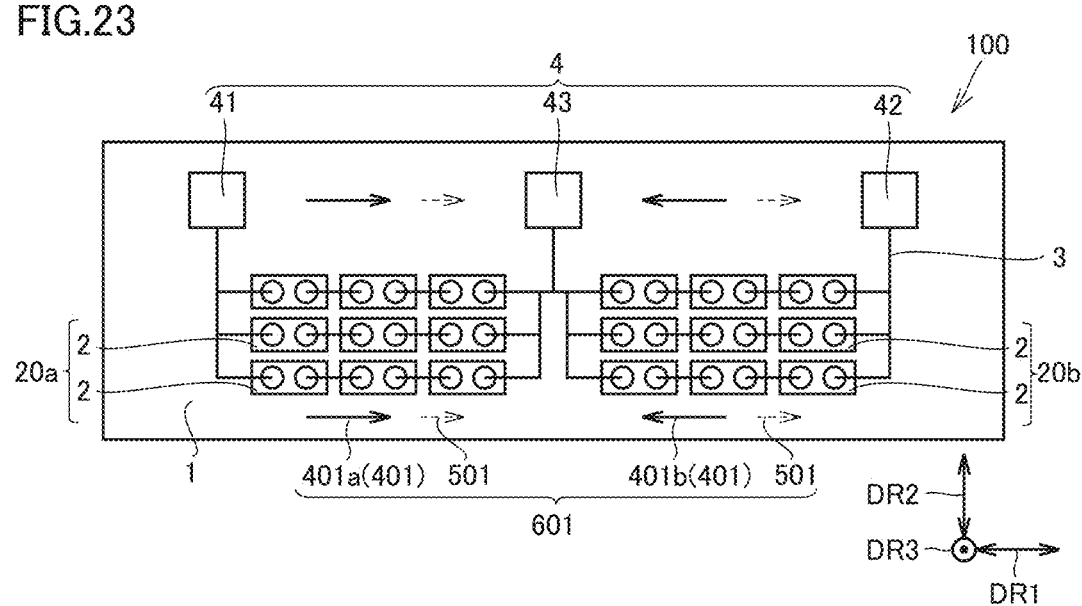
FIG. 23 is a top view schematically illustrating a configuration of a magnetic sensor according to a sixth embodiment.

As illustrated in FIG. 23, magnetic sensor 100 according to the present embodiment includes a first array 20a including a plurality of magnetic sensor elements 2 and a second array 20b including a plurality of magnetic sensor elements 2. The direction of current flowing through first array 20a is opposite to the direction of current flowing through second array 20b.

Electrode 4 includes first input electrode portion 41, a second input electrode portion 42, and output electrode portion 43. First input electrode portion 41 is electrically connected to a first end of first array 20a. Second input electrode portion 42 is electrically connected to a first end of second array 20b. Second input electrode portion 42 may be grounded. Output electrode portion 43 is electrically connected to a second end of first array 20a and a second end of second array 20b. Output electrode portion 43 is disposed between first array 20a and second array 20b.

Figure 24:
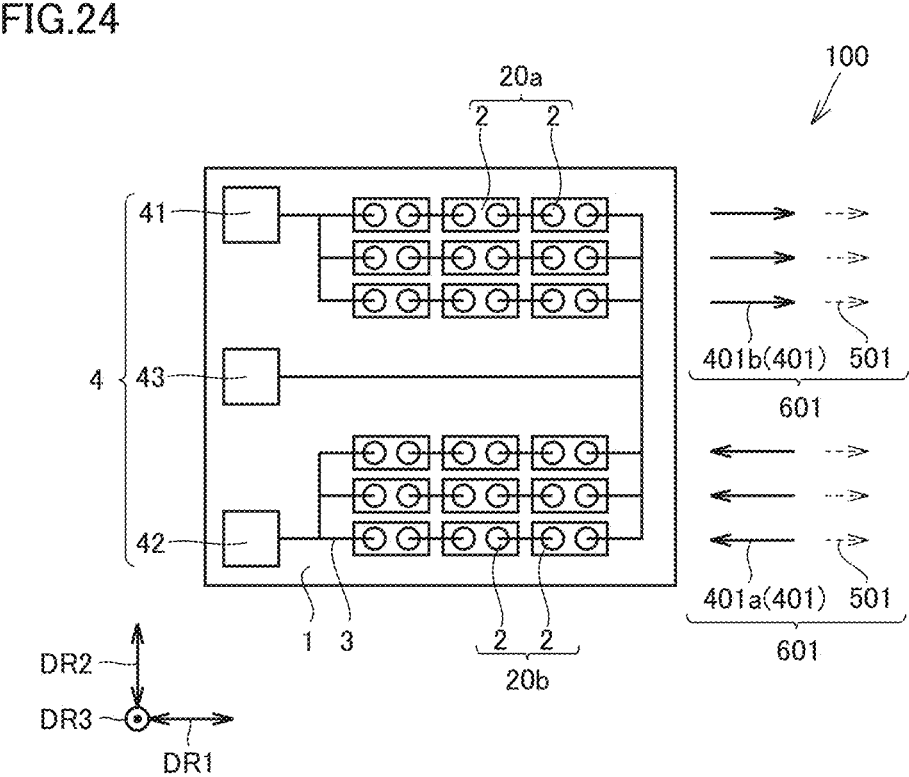
FIG. 24 is a top view schematically illustrating a configuration of a magnetic sensor according to a modification of the sixth embodiment.

Although first array 20a and second array 20b are arranged along X-axis direction DR1 in FIG. 23, they may be arranged along Y-axis direction DR2 as illustrated in FIG. 24. Furthermore, magnetic sensor 100 may include three or more arrays.

Next, the operation of magnetic sensor 100 according to the sixth embodiment will be described.

In the present embodiment, bias magnetic field 401 includes a first bias magnetic field 401a and a second bias magnetic field 401b. The direction of first bias magnetic field 401a is opposite to the direction of second bias magnetic field 401b. First bias magnetic field 401a has a component along the positive direction of the X axis. Second bias magnetic field 401b has a component along the negative direction of the X axis. Preferably, the magnitude of first bias magnetic field 401a is the same as the magnitude of second bias magnetic field 401b. The direction of detection magnetic field 501 is along the positive direction of the X axis.

As a result, the sign (plus or minus) of the resistance value of first array 20a is reverse to the sign (plus or minus) of the resistance value of second array 20b. Further, the absolute value of the resistance value of first array 20a is the same as the absolute value of the resistance value of second array 20b. A voltage is applied to first input electrode portion 41. Second input electrode portion 42 is grounded, so that the voltage applied to output electrode portion 43 is half the voltage applied to first input electrode portion 41.

When detection magnetic field 501 is applied to magnetic sensor 100 along the positive direction of the X axis, the magnitude of external magnetic field 601 applied to first array 20a is larger than first bias magnetic field 401a, and the magnitude of external magnetic field 601 applied to second array 20b is smaller than second bias magnetic field 401b. Therefore, the resistance value of first array 20a decreases, and the resistance value of second array 20b increases. Thus, the voltage of output electrode portion 43 increases. When detection magnetic field 501 is applied to magnetic sensor 100 along the negative direction of the X axis, the resistance value of first array 20a increases and the resistance value of second array 20b decreases. Thus, the voltage of output electrode portion 43 decreases. In other words, first array 20a and second array 20b having opposite output characteristics are bridge-connected.

Next, effects of the present embodiment will be described.

In magnetic sensor 100 according to the present embodiment, magnetic sensor element 2 includes first array 20a including a plurality of magnetic sensor elements 2 and second array 20b including a plurality of magnetic sensor elements 2 as illustrated in FIG. 23. Therefore, a change in the resistance value of magnetic sensor 100 when detection magnetic field 501 is applied is twice that of magnetic sensor 100 including one magnetic sensor element 2 or one array. Therefore, doubled output voltage can be obtained. Accordingly, the sensitivity of magnetic sensor 100 is improved.

Furthermore, in a case where magnetic sensor element 2 further includes second magnetic layer 26 and second nonmagnetic layer 27, a change in the resistance value with respect to a change in the detection magnetic field has opposite characteristics, and thus, the output voltage also has opposite characteristics. Therefore, detection magnetic field 501 can be detected by an output voltage having opposite characteristics.

Seventh Embodiment

Next, a configuration of magnetic sensor device 1000 according to a seventh embodiment will be described with reference to FIGS. 25 to 27. The seventh embodiment has the same configuration and effects as those of the sixth embodiment described above unless otherwise specified. Therefore, the same components as those in the sixth embodiment are denoted by the same reference numerals, and the description thereof will not be repeated.

Figure 25:
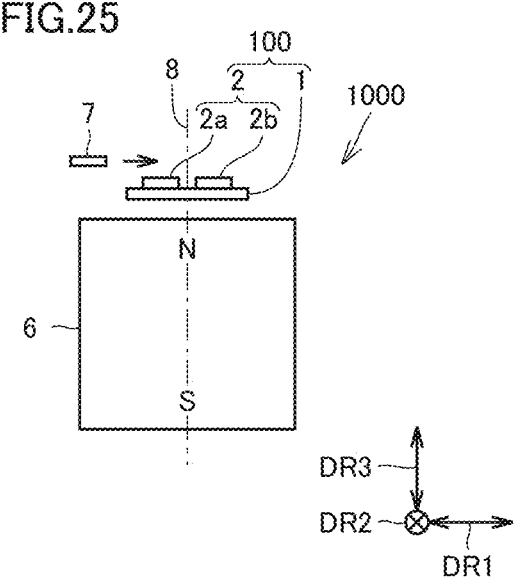
FIG. 25 is a side view schematically illustrating a configuration of a magnetic sensor device according to a seventh embodiment.

As illustrated in FIG. 25, magnetic sensor device 1000 is a magnetic sensor device for detecting a magnetic pattern of an object 7 that is moving. Object 7 is, for example, a sheet-like object such as a banknote on which a magnetic material such as a magnetic ink is printed. Alternatively, object 7 is, for example, a print medium such as a banknote on which a magnetic micropattern is formed. Magnetic sensor device 1000 is configured to move object 7 along X-axis direction DR1.

Figure 27:
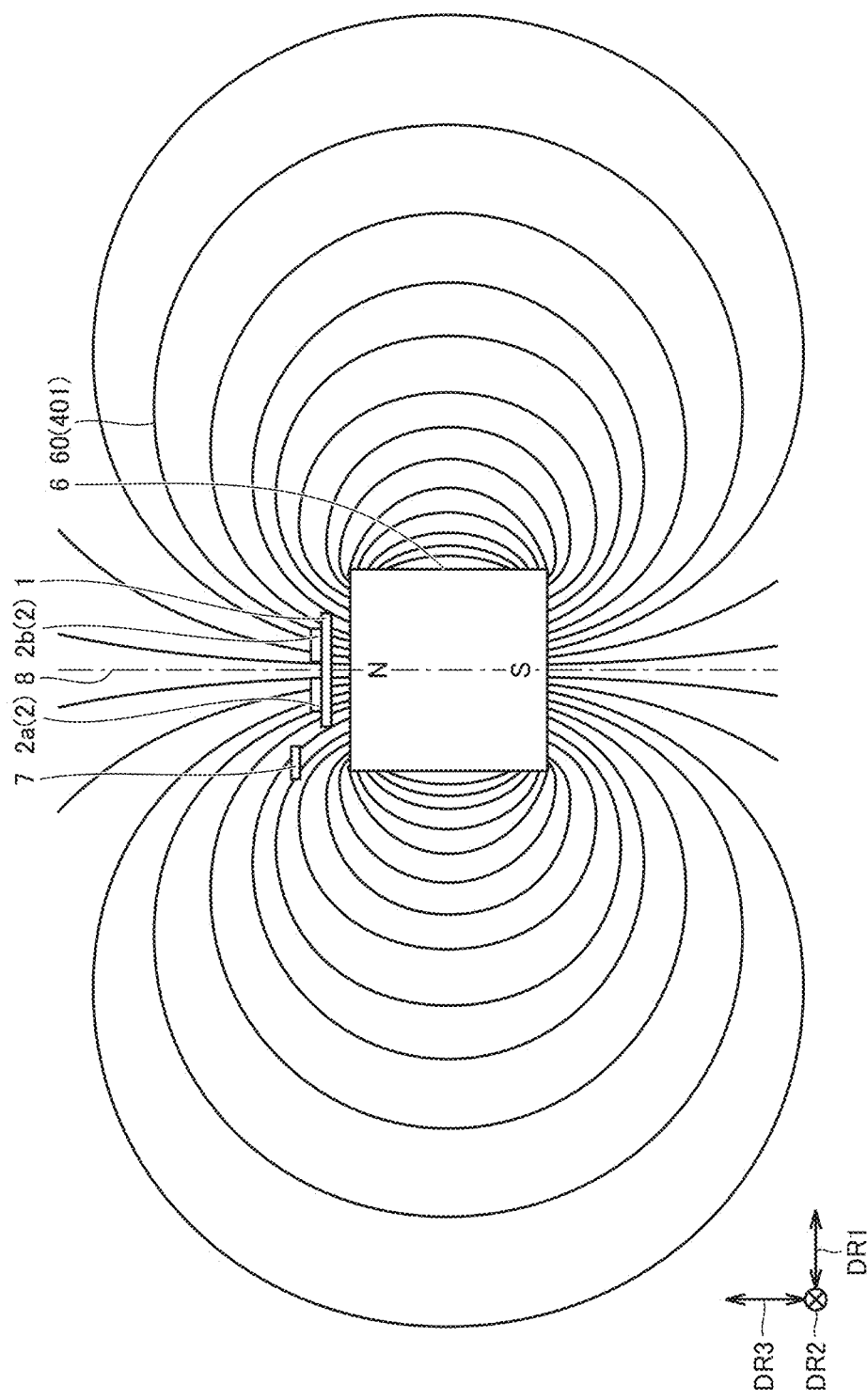
FIG. 27 is a side view schematically illustrating the configuration of the magnetic sensor device and magnetic field lines according to the seventh embodiment.

Magnetic sensor device 1000 includes magnetic sensor 100 and a magnetic field generating portion 6 that generates bias magnetic field 401 (see FIG. 27).

Figure 26:
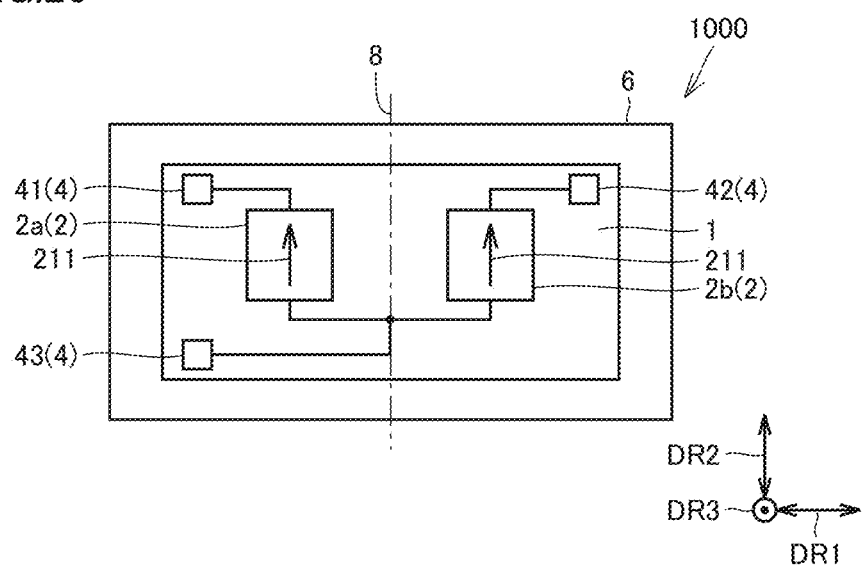
FIG. 26 is a top view schematically illustrating the configuration of the magnetic sensor device according to the seventh embodiment.

Magnetic sensor 100 of magnetic sensor device 1000 according to the present embodiment is disposed so as to overlap magnetic field generating portion 6 as illustrated in FIG. 26. The plurality of magnetic sensor elements 2 include a first magnetic sensor element 2a and a second magnetic sensor element 2b. First magnetic sensor element 2a and second magnetic sensor element 2b are disposed along the movement direction (X-axis direction DR1) with an internal therebetween. First magnetic sensor element 2a and second magnetic sensor element 2b are arranged to be line symmetric with respect to the center of magnetic field generating portion 6 in Y-axis direction DR2.

The position in the movement direction (X-axis direction DR1) of the center of the interval between first magnetic sensor element 2a and second magnetic sensor element 2b along the movement direction (X-axis direction DR1) is the same as the position in the movement direction (X-axis direction DR1) of a center 8 of magnetic field generating portion 6 along the movement direction (X-axis direction DR1). Each of pinned layer 21 of first magnetic sensor element 2a and pinned layer 21 of second magnetic sensor element 2b is disposed parallel to Y-axis direction DR2.

Electrode 4 is electrically connected to an external circuit (not illustrated) such as an amplifier circuit, a signal processing circuitry, and a bias voltage circuit by a metal wire (not illustrated) or the like.

Magnetic field generating portion 6 is, for example, a permanent magnet, an electromagnet, a current line, or the like. When magnetic field generating portion 6 is a current line, bias magnetic field 401 is a magnetic field generated from the current line. The bias voltage may be achieved by an appropriate arrangement of a yoke (yoke).

Next, the operation of magnetic sensor device 1000 according to the seventh embodiment will be described with reference to the drawings.

Figure 28:
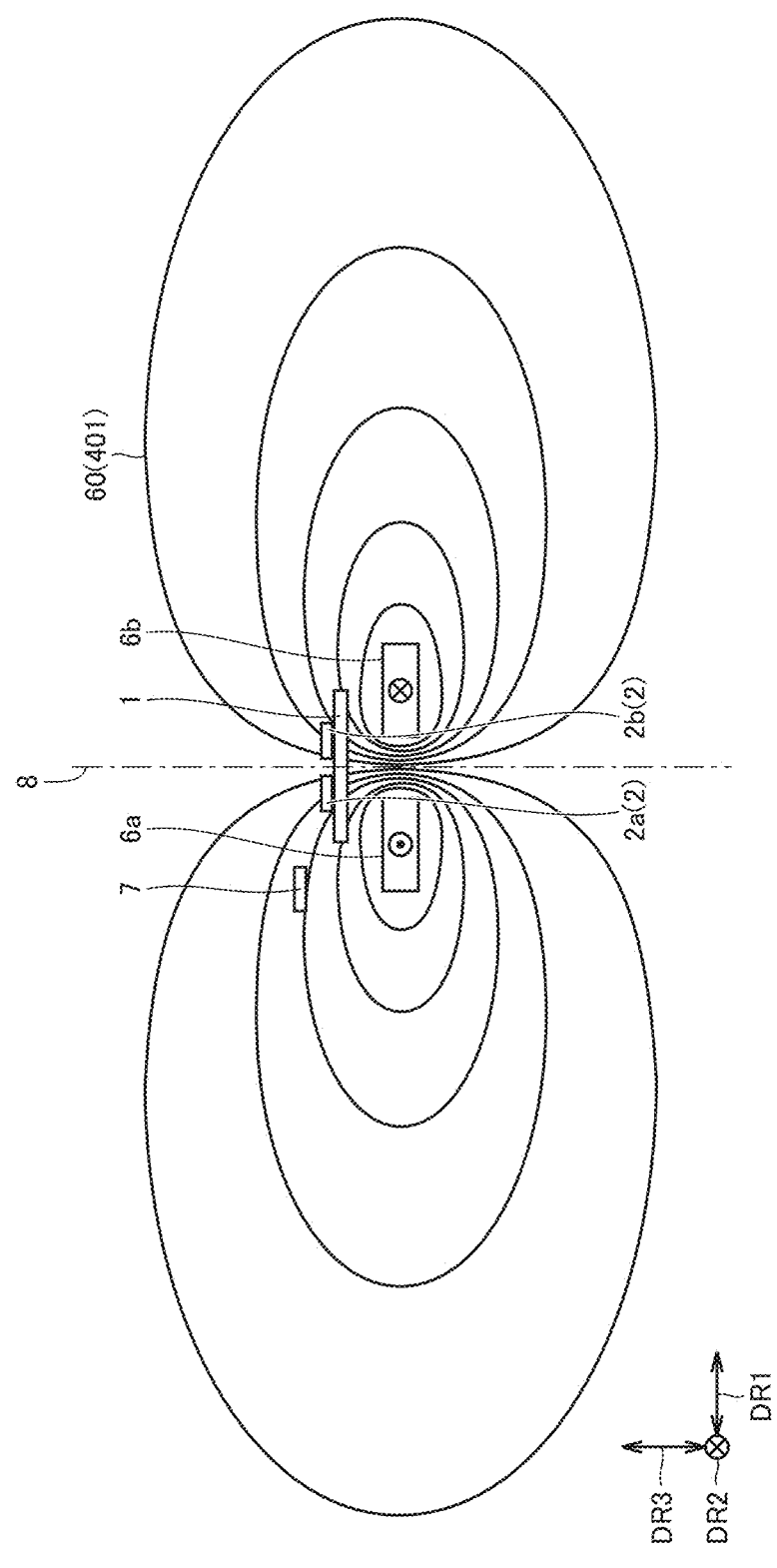
FIG. 28 is a side view schematically illustrating the configuration of a magnetic sensor device according to a modification of the seventh embodiment and magnetic field lines.

In FIG. 27, magnetic field generating portion 6 is a permanent magnet. The N pole of magnetic field generating portion 6 is disposed further to the positive side in Z-axis direction DR3 than the S pole. The magnetic field generating portion may be a current line as illustrated in FIG. 28.

As illustrated in FIG. 27, magnetic field lines 60 emitted from the N pole of magnetic field generating portion 6 are emitted from the XY plane on the N-pole side of magnetic field generating portion 6 to the outside of magnetic field generating portion 6 when viewed from the XZ plane. Magnetic field lines 60 emitted to the outside of magnetic field generating portion 6 enter magnetic field generating portion 6 from the XY plane on the S-pole side of magnetic field generating portion 6.

Above magnetic field generating portion 6, the magnetic field component of magnetic field lines 60 in Z-axis direction DR3 is larger than the magnetic field component in X-axis direction DR1. In other words, the main component of magnetic field lines 60 extends along Z-axis direction DR3 above magnetic field generating portion 6. Magnetic sensor element 2 is desirably disposed in a region where the main component of magnetic field lines 60 is along Z-axis direction DR3. Object 7 passes through the region where the main component of magnetic field lines 60 is along Z-axis direction DR3. As a result, the main component of magnetic field lines 60 intersects object 7.

Figure 29:
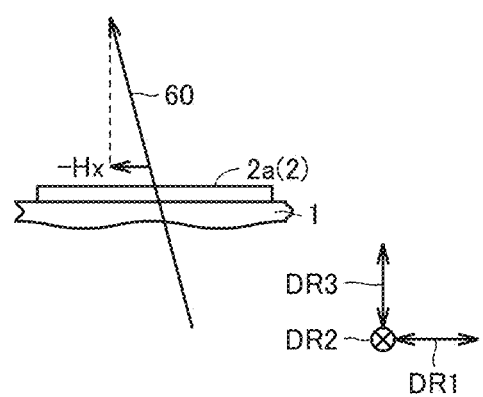
FIG. 29 is a side view schematically illustrating magnetic field lines applied to a first magnetic sensor element of the magnetic sensor device according to the seventh embodiment in a state where an object is not present.
Figure 30:
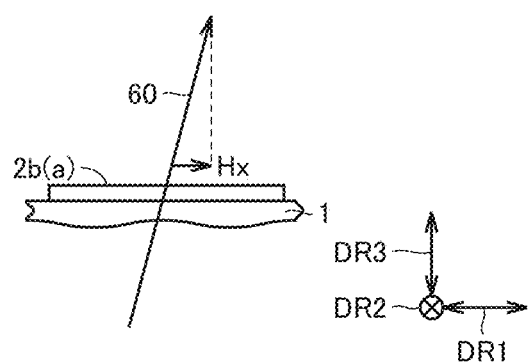
FIG. 30 is a side view schematically illustrating magnetic field lines applied to a second magnetic sensor element of the magnetic sensor device according to the seventh embodiment in a state where the object is not present.

More specifically, magnetic field lines 60 are inclined to the negative direction of the X axis from Z-axis direction DR3 at the position of first magnetic sensor element 2a as illustrated in FIG. 29. Therefore, magnetic field lines 60 act as bias magnetic field 401 directed in the negative direction of the X axis with respect to first magnetic sensor element 2a. In addition, magnetic field lines 60 are inclined to the positive direction of the X axis from Z-axis direction DR3 at the position of second magnetic sensor element 2b as illustrated in FIG. 30. Therefore, magnetic field lines 60 act as bias magnetic field 401 directed in the positive direction of the X axis with respect to second magnetic sensor element 2b.

Figure 31:
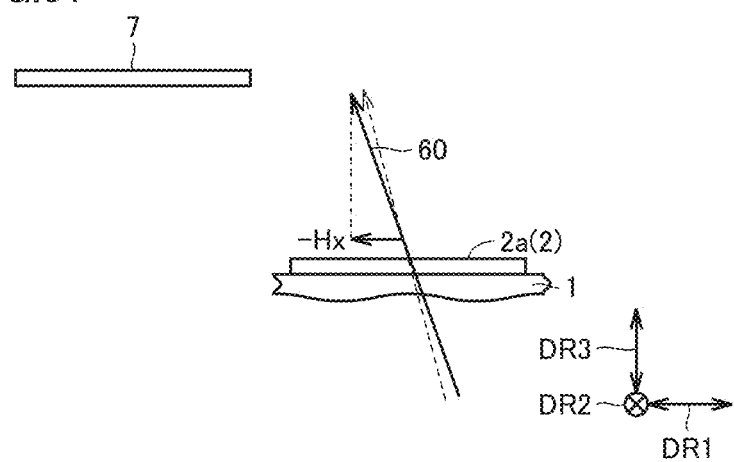
FIG. 31 is a side view schematically illustrating magnetic field lines applied to the first magnetic sensor element of the magnetic sensor device according to the seventh embodiment when the object approaches.

As object 7 approaches first magnetic sensor element 2a from the negative direction of the X axis, magnetic field lines 60 tilt toward the magnetic pattern of object 7 as illustrated in FIG. 31. Thus, the magnitude of bias magnetic field 401 acting on first magnetic sensor element 2a in the negative direction on the X axis increases.

Figure 32:
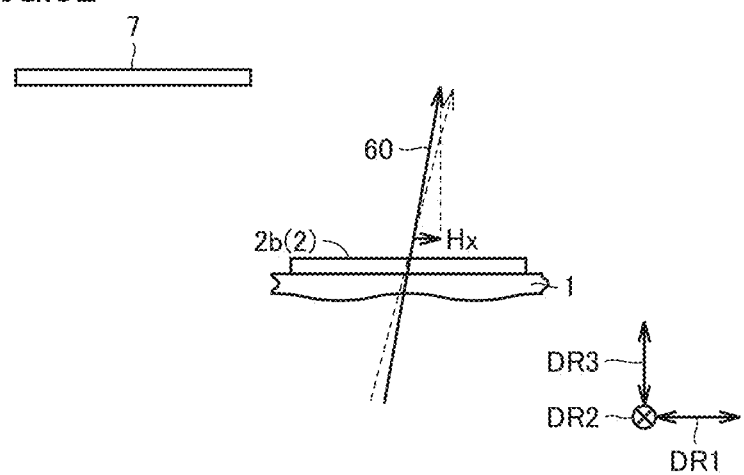
FIG. 32 is a side view schematically illustrating magnetic field lines applied to the second magnetic sensor element of the magnetic sensor device according to the seventh embodiment when the object approaches.

As object 7 approaches second magnetic sensor element 2b from the negative direction of the X axis, magnetic field lines 60 tilt toward the magnetic pattern of object 7 as illustrated in FIG. 32. Thus, the magnitude of bias magnetic field 401 acting on second magnetic sensor element 2b in the positive direction of the X axis decreases.

Figure 33:
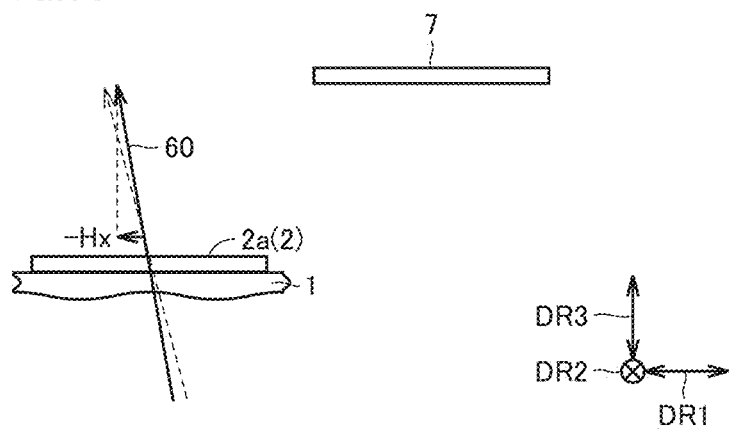
FIG. 33 is a side view schematically illustrating magnetic field lines applied to the first magnetic sensor element of the magnetic sensor device according to the seventh embodiment when the object moves away.

As object 7 moves away from first magnetic sensor element 2a to the positive direction of the X axis, magnetic field lines 60 tilt toward the magnetic pattern of object 7 as illustrated in FIG. 33. Thus, the magnitude of bias magnetic field 401 acting on first magnetic sensor element 2a in the negative direction on the X axis decreases.

Figure 34:
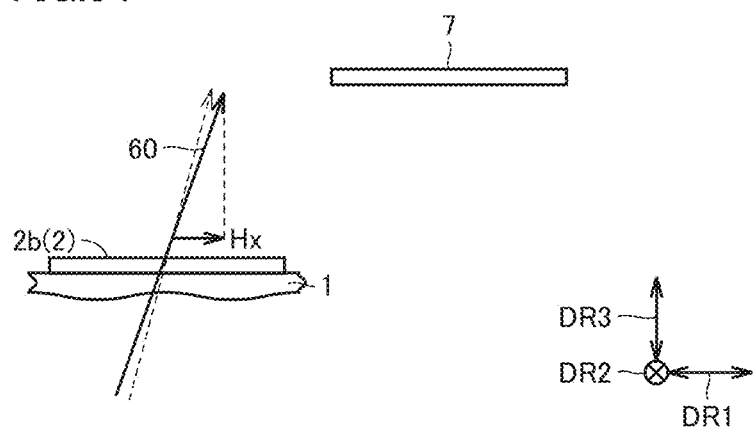
FIG. 34 is a side view schematically illustrating magnetic field lines applied to the second magnetic sensor element of the magnetic sensor device according to the seventh embodiment when the object moves away.

As object 7 moves away from second magnetic sensor element 2b to the positive direction of the X axis, magnetic field lines 60 tilt toward the magnetic pattern of object 7 as illustrated in FIG. 34. Thus, the magnitude of bias magnetic field 401 acting on second magnetic sensor element 2b in the positive direction of the X axis increases.

As described above, when object 7 having the magnetic pattern moves toward or away from magnetic sensor element 2, bias magnetic field 401 (external magnetic field 601) acting on magnetic sensor element 2 changes. Therefore, resistance value R of magnetic sensor element 2 changes. Accordingly, the magnetic pattern of object 7 can be detected on the basis of a change in the resistance value of magnetic sensor element 2.

Next, effects of the present embodiment will be described.

In magnetic sensor device 1000 according to the present embodiment, the position in the movement direction (X-axis direction DR1) of the center of the interval between first magnetic sensor element 2a and second magnetic sensor element 2b along the movement direction (X-axis direction DR1) is the same as the position in the movement direction (X-axis direction DR1) of center 8 of magnetic field generating portion 6 along the movement direction (X-axis direction DR1) as illustrated in FIGS. 25 and 26. Therefore, first magnetic sensor element 2a and second magnetic sensor element 2b are arranged on substrate 1 to be line symmetric with respect to the center of magnetic field generating portion 6 along the movement direction (X-axis direction DR1). Thus, the operation of first magnetic sensor element 2a is reverse to the operation of second magnetic sensor element 2b. Accordingly, the bridge output, which is the sum of first magnetic sensor element 2a and second magnetic sensor element 2b, is twice as large as that of a device having only one magnetic sensor element 2. As a result, magnetic sensor device 1000 can provide an output twice that of the device having only one magnetic sensor element 2.

Eighth Embodiment

Next, a configuration of magnetic sensor device 1000 according to an eighth embodiment will be described with reference to FIG. 35. The eighth embodiment has the same configuration and effects as those of the seventh embodiment described above unless otherwise specified. Therefore, the same components as those in the seventh embodiment are denoted by the same reference numerals, and the description thereof will not be repeated.

Figure 35:
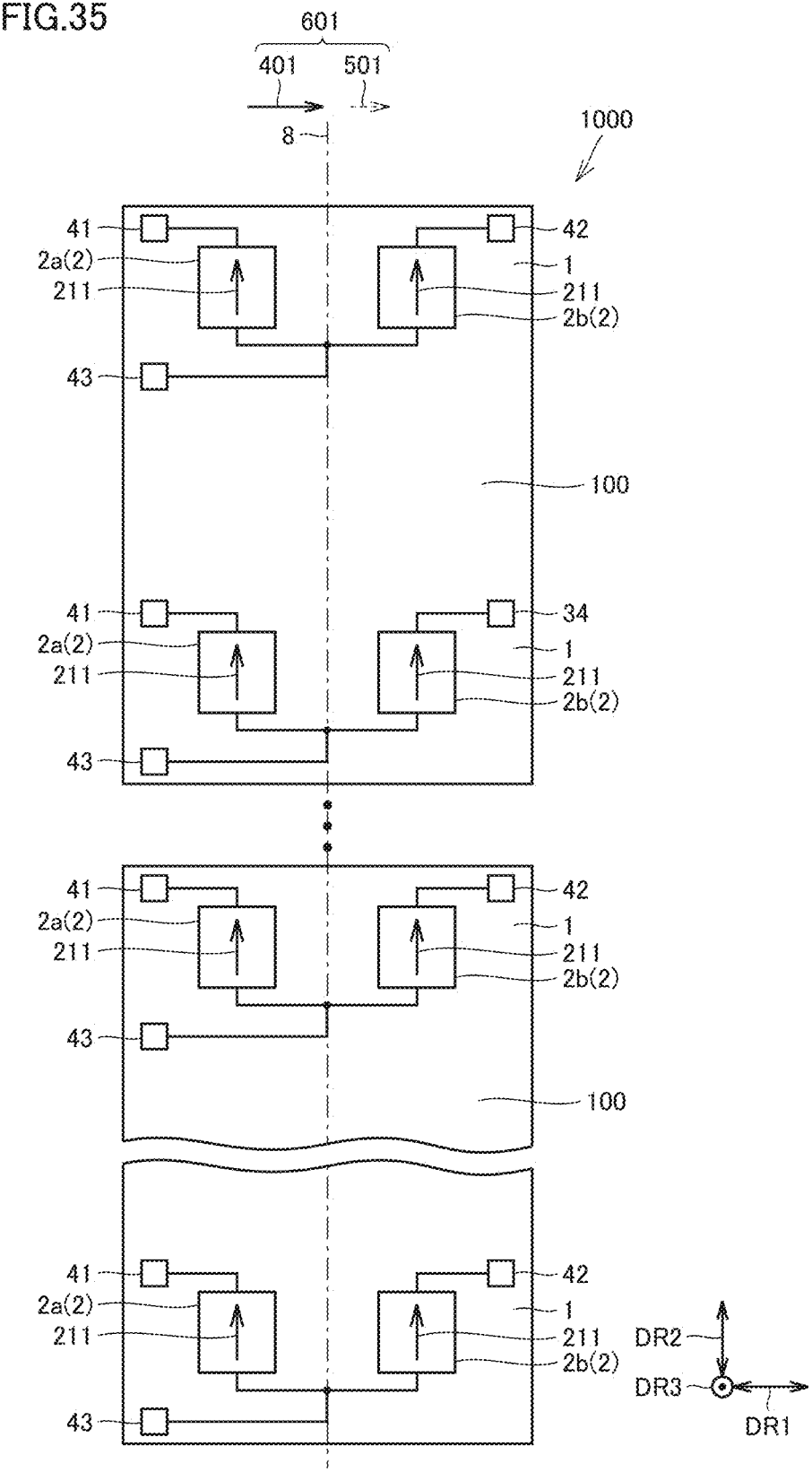
FIG. 35 is a top view schematically illustrating a configuration of a magnetic sensor device according to an eighth embodiment.

Magnetic sensor device 1000 according to the present embodiment includes a plurality of magnetic sensors 100 as illustrated in FIG. 35. The plurality of magnetic sensors 100 are repeatedly disposed along a direction (Y-axis direction DR2) orthogonal to each of the lamination direction (Z-axis direction DR3) and the movement direction (X-axis direction DR1).

Substrates 1 of the plurality of magnetic sensors 100 are desirably the same, but the configuration is not limited thereto. Magnetic field generating portions 6 of the plurality of magnetic sensors 100 are desirably the same, but the configuration is not limited thereto.

Next, effects of the present embodiment will be described.

In magnetic sensor device 1000 according to the present embodiment, the plurality of magnetic sensors 100 are repeatedly disposed along the direction (Y-axis direction DR2) orthogonal to each of the lamination direction (Z-axis direction DR3) and the movement direction (X-axis direction DR1) as illustrated in FIG. 35. Therefore, the magnetism of object 7 can be detected linearly along the direction (Y-axis direction DR2) in which the plurality of magnetic sensors 100 are repeatedly arranged.

Object 7 moves along X-axis direction DR1, so that the distribution of the magnetic material in the XY plane can be acquired by continuously extracting the outputs along Y-axis direction DR2 by the plurality of magnetic sensors 100 along X-axis direction DR1. For example, a magnetic pattern (distribution of a magnetic material) of a banknote or the like having the magnetic pattern printed thereon with a magnetic ink can be acquired.

The embodiments and modifications disclosed herein are to be considered in all respects as illustrative and not restrictive. The scope of the present disclosure is defined not by the above description but by the claims, and is intended to include meanings equivalent to the claims and all modifications within the scope.

REFERENCE SIGNS LIST

1: substrate, 2: magnetic sensor element, 6: magnetic field generating portion, 7: object, 8: center, 21: pinned layer, 22: first non-magnetic layer, 23: first magnetic layer, 24: free layer, 25: tunnel insulating film, 26: second magnetic layer, 27: second non-magnetic layer, 100: magnetic sensor, 1000: magnetic sensor device

The invention claimed is:
1. A magnetic sensor element comprising:
a pinned layer having a fixed magnetization direction;
a first non-magnetic layer laminated on the pinned layer;
a first magnetic layer holding the first non-magnetic layer with the pinned layer; and
a free layer disposed along a lamination direction in which the first non-magnetic layer is laminated on the pinned layer, wherein each of the first magnetic layer and the free layer has a magnetization direction more easily changed by an external magnetic field than a magnetization direction of the pinned layer, the pinned layer and the first magnetic layer are coupled by indirect exchange interaction, and a direction of a bias magnetic field is along a direction of a detection magnetic field and orthogonal to the magnetization direction of the pinned layer.

2. The magnetic sensor element according to claim 1, further comprising:

a second non-magnetic layer; and a second magnetic layer disposed on a side opposite to the pinned layer with respect to the first magnetic layer and holding the second non-magnetic layer with the free layer, wherein a magnetization direction of the second magnetic layer is opposite to a magnetization direction of the free layer.

3. The magnetic sensor element according to claim 1, further comprising a tunnel insulating film using a tunneling effect, wherein the tunnel insulating film is sandwiched between the first magnetic layer and the free layer.

4. The magnetic sensor element according to claim 1, wherein each of the pinned layer and the first magnetic layer has a circular shape when viewed in the lamination direction.

5. The magnetic sensor element according to claim 1, wherein a shape of the free layer is a rectangle when viewed in the lamination direction, and the rectangle has a long side extending along a direction of the external magnetic field.

6. The magnetic sensor element according to claim 1, wherein, in a state where the external magnetic field is not applied, the magnetization direction of the first magnetic layer is either identical to a magnetization direction of the pinned layer or opposite to the magnetization direction of the pinned layer.

7. The magnetic sensor element according to claim 6, wherein, in a state where the external magnetic field is not applied, the magnetization direction of the pinned layer is orthogonal to the magnetization direction of the free layer when viewed in the lamination direction.

8. A magnetic sensor comprising:

the magnetic sensor element according to claim 1; and a substrate, wherein a plurality of the magnetic sensor elements are provided, the plurality of magnetic sensor elements are connected to the substrate, and the plurality of magnetic sensor elements are electrically connected to each other on the substrate.

9. A magnetic sensor device to detect a magnetic pattern of an object that is moving, the magnetic sensor device comprising:

the magnetic sensor according to claim 8; and a magnetic field generating portion to generate a bias magnetic field included in the external magnetic field, wherein the magnetic sensor is disposed so as to overlap the magnetic field generating portion, the plurality of magnetic sensor elements include a first magnetic sensor element and a second magnetic sensor element that are arranged at an interval along a movement direction of the object, and a position in the movement direction of a center of the interval between the first magnetic sensor element and the second magnetic sensor element along the movement direction is identical to a position in the movement direction of a center of the magnetic field generating portion along the movement direction.

10. The magnetic sensor device according to claim 9, comprising a plurality of the magnetic sensors, wherein the plurality of magnetic sensors are repeatedly arranged along a direction orthogonal to each of the lamination direction and the movement direction.

11. A magnetic sensor device to detect a magnetic pattern of an object that is moving, the magnetic sensor device comprising:

a magnetic sensor; and a magnetic field generating portion to generate a bias magnetic field included in an external magnetic field, the magnetic sensor comprising:

a magnetic sensor element; and a substrate, the magnetic sensor element comprising:

a pinned layer having a fixed magnetization direction;

a first non-magnetic layer laminated on the pinned layer;

a first magnetic layer holding the first non-magnetic layer with the pinned layer; and a free layer disposed along a lamination direction in which the first non-magnetic layer is laminated on the pinned layer, wherein each of the first magnetic layer and the free layer has a magnetization direction more easily changed by the external magnetic field than a magnetization direction of the pinned layer, the pinned layer and the first magnetic layer are coupled by indirect exchange interaction, a plurality of the magnetic sensor elements are provided, the plurality of magnetic sensor elements are connected to the substrate, the plurality of magnetic sensor elements are electrically connected to each other on the substrate, the magnetic sensor is disposed so as to overlap the magnetic field generating portion, the plurality of magnetic sensor elements include a first magnetic sensor element and a second magnetic sensor element that are arranged at an interval along a movement direction of the object, and a position in the movement direction of a center of the interval between the first magnetic sensor element and the second magnetic sensor element along the movement direction is identical to a position in the movement direction of a center of the magnetic field generating portion along the movement direction.

12. The magnetic sensor device according to claim 11, comprising a plurality of the magnetic sensors, wherein the plurality of magnetic sensors are repeatedly arranged along a direction orthogonal to each of the lamination direction and the movement direction.

* * * * *